(12) United States Patent
Skinkle

(10) Patent No.: US 8,920,996 B2
(45) Date of Patent: Dec. 30, 2014

(54) SYSTEMS AND METHODS FOR REGULATING FUEL CELL AIR FLOW DURING LOW LOADS OR COLD TEMPERATURE OPERATION

(75) Inventor: David W. Skinkle, Bend, OR (US)

(73) Assignee: DCNS, La Montagne (FR)

( * ) Notice: Subject to any disclaimer, the term of this patent is extended or adjusted under 35 U.S.C. 154(b) by 583 days.

(21) Appl. No.: 13/097,350

(22) Filed: Apr. 29, 2011

(65) Prior Publication Data

US 2011/0281190 A1     Nov. 17, 2011

Related U.S. Application Data

(60) Provisional application No. 61/333,350, filed on May 11, 2010.

(51) Int. Cl.
 *H01M 8/04*     (2006.01)
 *H01M 8/10*     (2006.01)

(52) U.S. Cl.
 CPC ...... *H01M 8/04014* (2013.01); *H01M 8/04701* (2013.01); *H01M 2008/1095* (2013.01); *Y02E 60/50* (2013.01)
 USPC .......................................... 429/433; 429/437

(58) Field of Classification Search
 CPC ................................................ H01M 8/04014
 USPC ................................................ 429/433–442
 See application file for complete search history.

(56) References Cited

U.S. PATENT DOCUMENTS

| | | |
|---|---|---|
| 2,824,620 A | 2/1958 | De Rosset |
| 3,336,730 A | 8/1967 | McBride et al. |
| 3,338,681 A | 8/1967 | Kordesch |
| 3,350,176 A | 10/1967 | Green et al. |
| 3,469,944 A | 9/1969 | Bocard et al. |
| 3,522,019 A | 7/1970 | Buswell et al. |
| 3,564,816 A | 2/1971 | Batta |
| 3,655,448 A | 4/1972 | Setzer |
| 3,986,849 A | 10/1976 | Fuderer et al. |
| 4,098,959 A | 7/1978 | Fanciullo |
| 4,098,960 A | 7/1978 | Gagnon |
| 4,175,165 A | 11/1979 | Adlhart |
| 4,214,969 A | 7/1980 | Lawrance |
| 4,331,455 A | 5/1982 | Sato |
| 4,384,672 A | 5/1983 | Kutzner et al. |

(Continued)

OTHER PUBLICATIONS

International Search Report and Written Opinion for PCT Patent Application Serial No. PCT/US11/34730, dated Sep. 2, 2011.

*Primary Examiner* — Maria J Laios
(74) *Attorney, Agent, or Firm* — Dascenzo Intellectual Property Law, P.C.

(57) ABSTRACT

Systems and methods for regulating fuel cell air flow, such as during low loads and/or cold temperature operation. These systems and methods may include providing a thermal management fluid, such as air, to the fuel cell stack, transferring thermal energy between the thermal management fluid and the fuel cell stack, and varying the flow rate of the thermal management fluid that comes into contact with the fuel cell stack to maintain the temperature of the fuel cell stack within an acceptable temperature range. Varying the flow rate of the thermal management fluid may include varying the overall supply rate of the thermal management fluid within the fuel cell system and/or providing an alternative flow path for the thermal management fluid such that a portion of the thermal management fluid supplied by the fuel cell system does not come into contact with the fuel cell stack.

26 Claims, 6 Drawing Sheets

(56) References Cited

U.S. PATENT DOCUMENTS

| | | | |
|---|---|---|---|
| 4,468,235 A | 8/1984 | Hill | |
| 5,401,589 A | 3/1995 | Palmer et al. | |
| 5,432,710 A | 7/1995 | Ishimaru et al. | |
| 5,441,559 A | 8/1995 | Petit et al. | |
| 5,637,414 A | 6/1997 | Inoue et al. | |
| 5,861,137 A | 1/1999 | Edlund | |
| 5,997,594 A | 12/1999 | Edlund et al. | |
| 6,083,637 A | 7/2000 | Walz et al. | |
| 6,106,964 A * | 8/2000 | Voss et al. | 429/413 |
| 6,152,995 A | 11/2000 | Edlund | |
| 6,221,117 B1 | 4/2001 | Edlund et al. | |
| 6,319,306 B1 | 11/2001 | Edlund et al. | |
| 6,375,906 B1 | 4/2002 | Edlund et al. | |
| 6,376,113 B1 | 4/2002 | Edlund et al. | |
| 6,383,670 B1 | 5/2002 | Edlund et al. | |
| 6,419,728 B1 | 7/2002 | Edlund | |
| 6,494,937 B1 | 12/2002 | Edlund et al. | |
| 6,495,277 B1 | 12/2002 | Edlund et al. | |
| 6,497,856 B1 | 12/2002 | Lomax, Jr. et al. | |
| 6,497,971 B1 | 12/2002 | Reiser | |
| 6,508,246 B1 | 1/2003 | Fiedler | |
| 6,537,352 B2 | 3/2003 | Edlund et al. | |
| 6,547,858 B1 | 4/2003 | Edlund et al. | |
| 6,562,111 B2 | 5/2003 | Edlund et al. | |
| 6,569,227 B2 | 5/2003 | Edlund et al. | |
| 6,596,057 B2 | 7/2003 | Edlund et al. | |
| 6,648,018 B2 | 11/2003 | Gagnon | |
| 6,649,290 B2 * | 11/2003 | Leboe et al. | 429/423 |
| 6,692,545 B2 | 2/2004 | Gittleman et al. | |
| 6,811,908 B2 | 11/2004 | Edlund et al. | |
| 6,835,481 B2 | 12/2004 | Dickman et al. | |
| 6,890,672 B2 | 5/2005 | Dickman et al. | |
| 6,959,730 B2 | 11/2005 | Margiott | |
| 6,979,507 B2 | 12/2005 | Edlund et al. | |
| 7,128,769 B2 | 10/2006 | Renn | |
| 7,135,048 B1 | 11/2006 | Edlund et al. | |
| 7,160,367 B2 | 1/2007 | Babicki et al. | |
| 7,191,858 B2 * | 3/2007 | Vanderwees et al. | 180/65.31 |
| 7,208,241 B2 | 4/2007 | Edlund et al. | |
| 7,390,587 B2 | 6/2008 | Dickman et al. | |
| 7,393,382 B2 | 7/2008 | Givens | |
| 7,399,342 B2 | 7/2008 | Bizjak | |
| 7,416,569 B2 | 8/2008 | Sumi et al. | |
| 7,601,302 B2 | 10/2009 | Edlund et al. | |
| 7,632,322 B2 | 12/2009 | Edlund | |
| 7,659,019 B2 | 2/2010 | Edlund | |
| 2001/0045061 A1 | 11/2001 | Edlund et al. | |
| 2003/0170522 A1 * | 9/2003 | Hirsch | 429/34 |
| 2003/0192251 A1 | 10/2003 | Edlund et al. | |
| 2003/0223926 A1 | 12/2003 | Edlund et al. | |
| 2005/0014040 A1 * | 1/2005 | Kaye | 429/20 |
| 2005/0260463 A1 * | 11/2005 | Chapman et al. | 429/13 |
| 2005/0266284 A1 | 12/2005 | Scharf | |
| 2005/0266285 A1 | 12/2005 | Edlund et al. | |
| 2006/0024540 A1 | 2/2006 | LaVen et al. | |
| 2006/0134473 A1 | 6/2006 | Edlund et al. | |
| 2007/0264546 A1 | 11/2007 | LaVen | |
| 2007/0266631 A1 | 11/2007 | Pledger et al. | |
| 2007/0274904 A1 | 11/2007 | Popham et al. | |
| 2008/0138678 A1 | 6/2008 | Hill | |
| 2008/0176118 A1 | 7/2008 | Edlund et al. | |
| 2008/0210088 A1 | 9/2008 | Pledger | |
| 2008/0222954 A1 | 9/2008 | Adams et al. | |
| 2009/0151249 A1 | 6/2009 | Adams et al. | |
| 2009/0151560 A1 | 6/2009 | Adams et al. | |
| 2009/0155642 A1 | 6/2009 | Popham | |
| 2010/0021783 A1 | 1/2010 | Osada et al. | |
| 2010/0028223 A1 | 2/2010 | Popham et al. | |
| 2010/0035106 A1 | 2/2010 | Osada et al. | |
| 2010/0112387 A1 | 5/2010 | Nagasawa | |

* cited by examiner

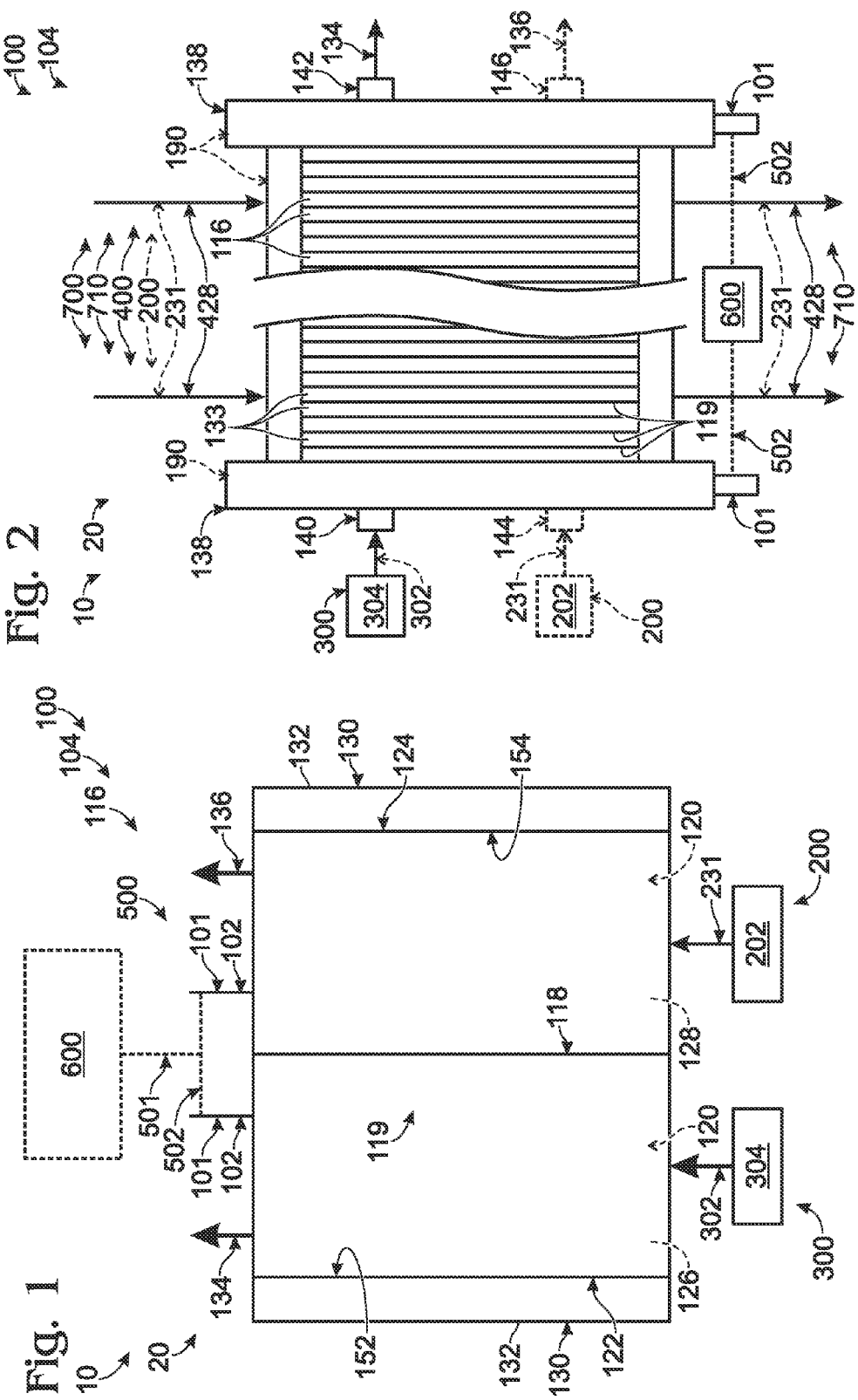

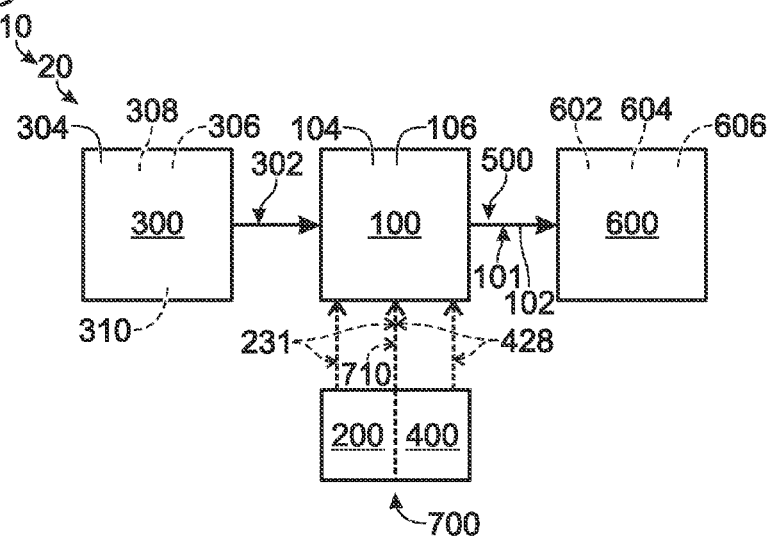
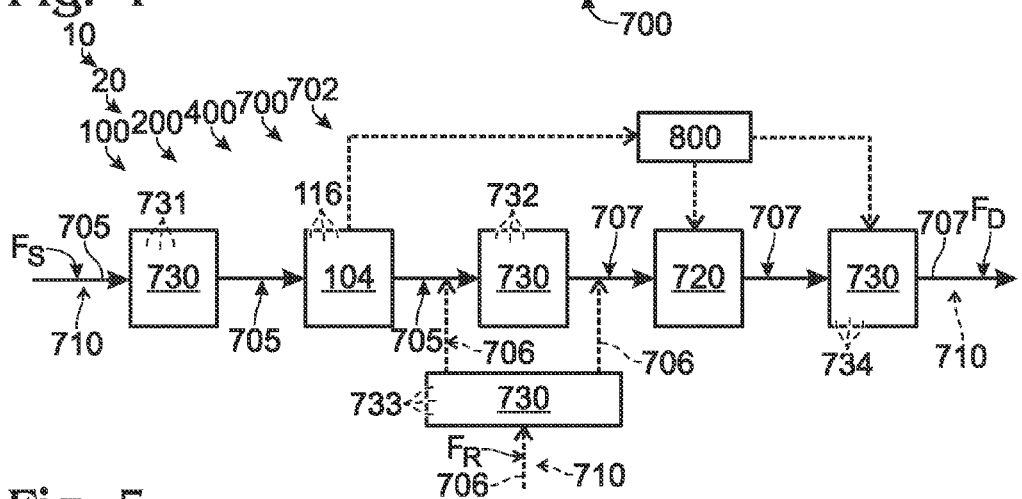
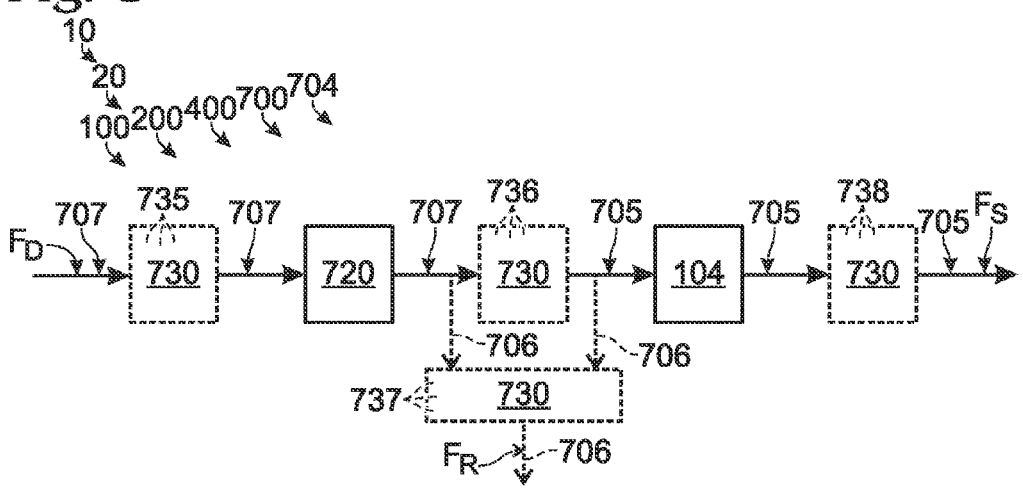

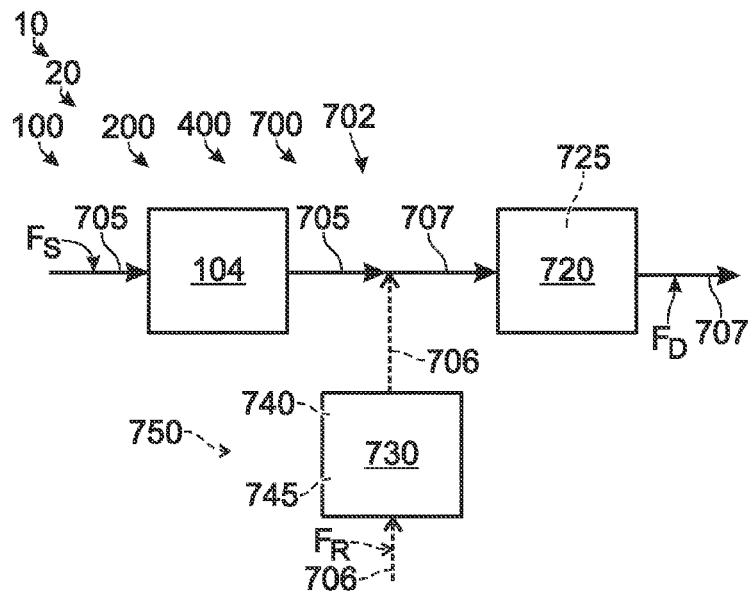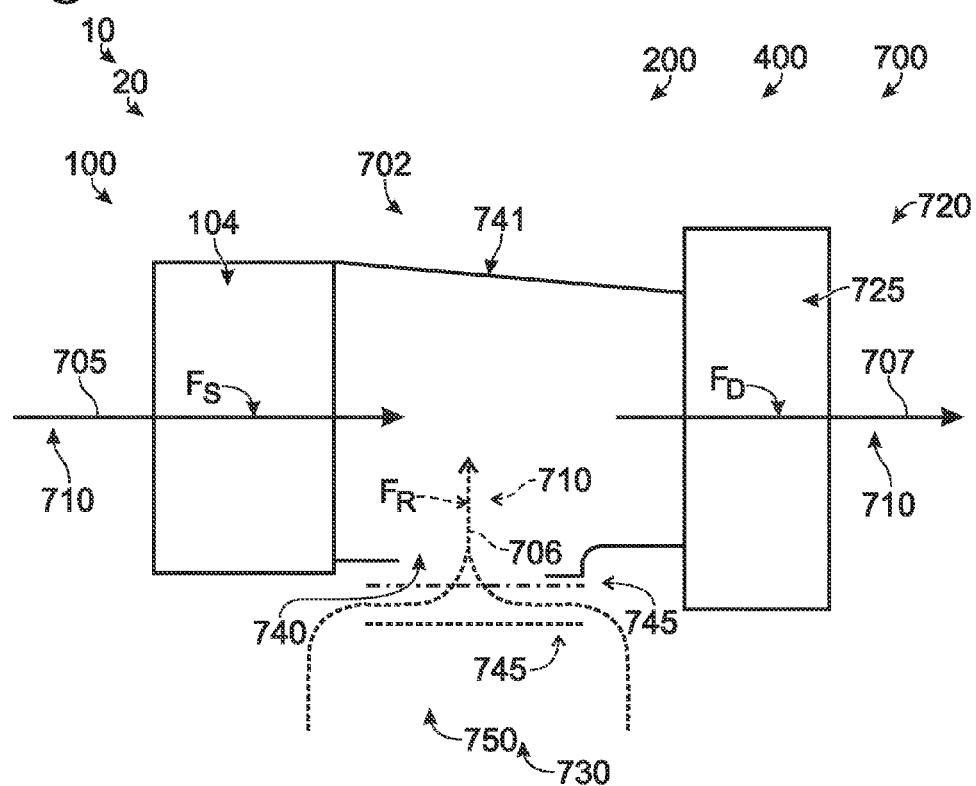

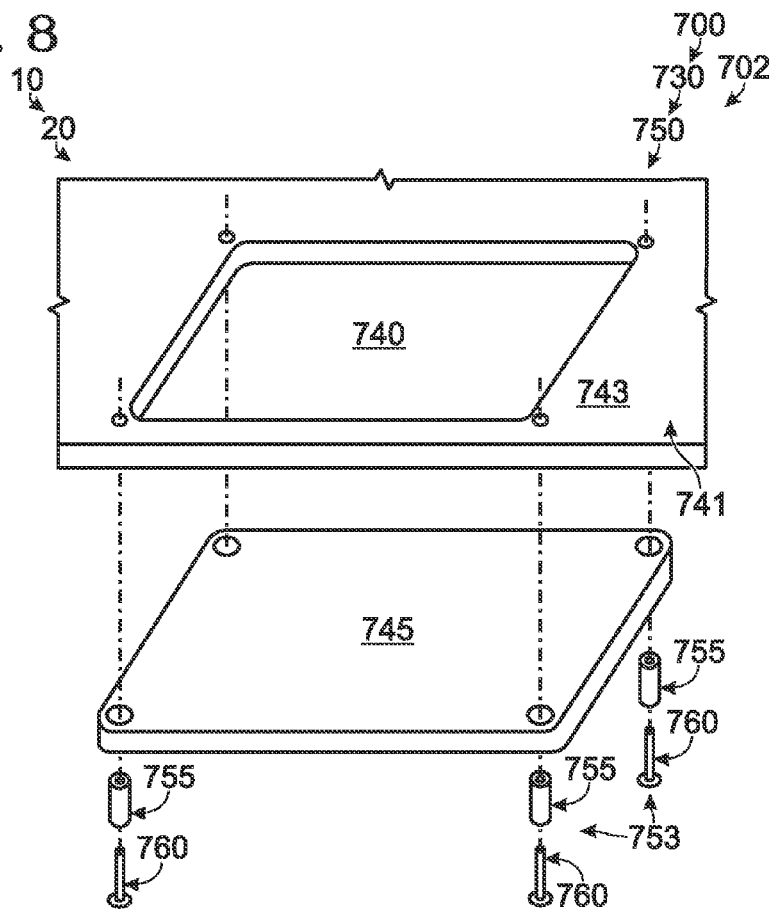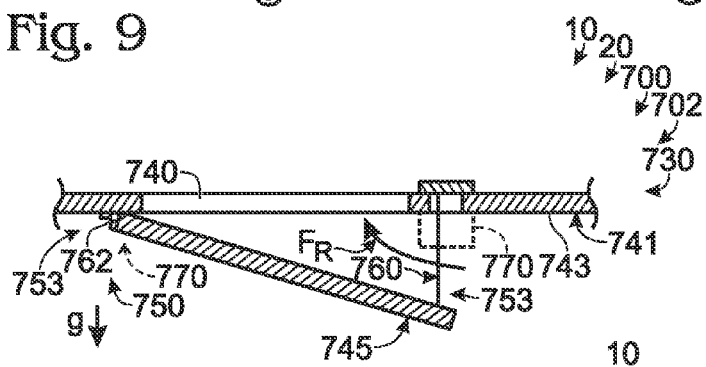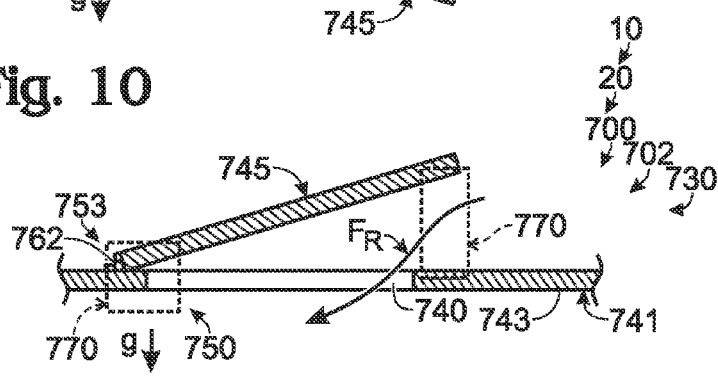

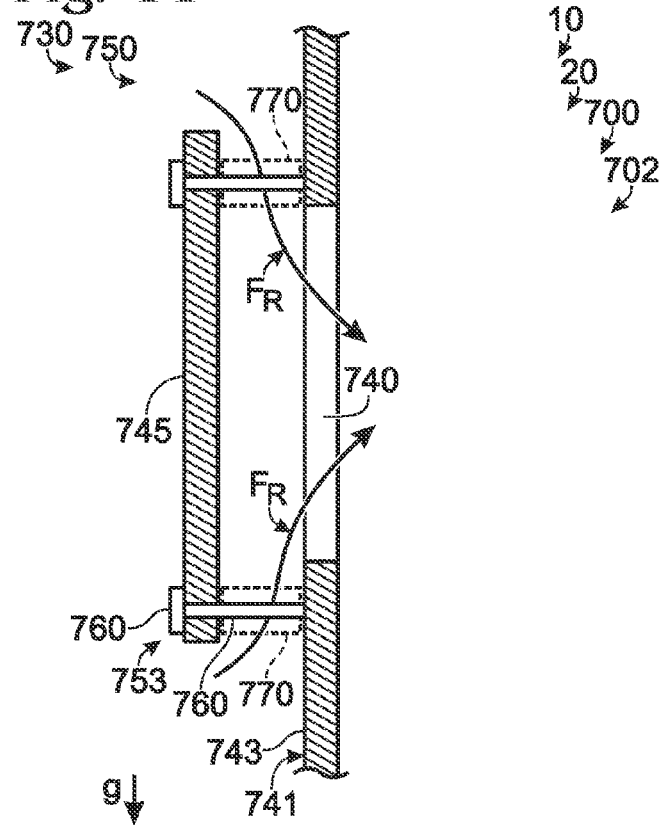
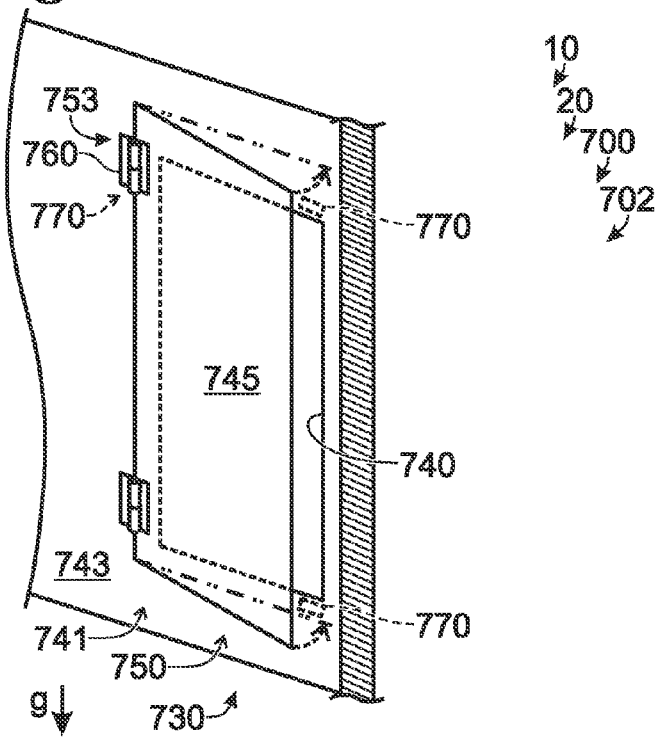

SYSTEMS AND METHODS FOR REGULATING FUEL CELL AIR FLOW DURING LOW LOADS OR COLD TEMPERATURE OPERATION

RELATED APPLICATION

The present application claims priority to similarly entitled U.S. Provisional Patent Application Ser. No. 61/333,350, which was filed on May 11, 2010, and the complete disclosure of which is hereby incorporated by reference.

FIELD OF THE DISCLOSURE

The present disclosure is related generally to thermal management systems and methods, and more specifically to systems and methods for thermal management of fuel cell systems under low load or low ambient temperature conditions.

BACKGROUND OF THE DISCLOSURE

Fuel cell stacks are electrochemical devices that produce water and an electrical potential from a fuel, such as a proton source, and an oxidant. Although other fuels and oxidants may and have been used, many conventional fuel cell stacks utilize hydrogen gas as the proton source and oxygen gas, air, or oxygen-enriched air as the oxidant. Fuel cell stacks typically include many fuel cells that are fluidly and electrically coupled together between common end plates. Each fuel cell includes an anode region and a cathode region, separated by an electrolytic membrane. Hydrogen gas is delivered to the anode region, and oxygen gas is delivered to the cathode region. Protons from the hydrogen gas are drawn through the electrolytic membrane to the cathode region, where they react with oxygen to form water. While protons may pass through the membrane, electrons cannot. Instead, the electrons that are liberated from the hydrogen gas travel through an external circuit to form an electric current, which also may be referred to as the electrical output of the fuel cell.

The electrochemical reaction utilized within fuel cell stacks is an exothermic reaction. Thus, the fuel cell stack may be thought of as generating both electrical potential and thermal energy (heat). The electrolytic membranes of some fuel cell systems, such as proton exchange membrane (PEM), or solid polymer fuel cell systems, generally need to be within a range of suitable operating temperatures in order for the electrolytic membranes to function properly for generation of the electrical output. If the membrane is below this range of suitable operating temperatures, the fuel cell may not efficiently produce its electrical output. On the other hand, if the membrane is above this range of suitable temperatures, degradation of the membrane may occur.

Thus, conventional fuel cell systems may utilize a thermal management system to control the temperature of the fuel cell stack. This may include supplying thermal energy to the fuel cell stack under conditions in which the temperature of the fuel cell stack is below the range of suitable operating temperatures and/or removing thermal energy from the fuel cell stack under conditions in which the temperature of the fuel cell stack is above the range of suitable operating temperatures. Cooling of the fuel cell stack may be accomplished by directing a stream of thermal management fluid, such as, for example, ambient air, to, or into thermal contact with, the fuel cell stack and exchanging thermal energy between the fuel cell stack and the thermal management fluid. The flow rate of the thermal management fluid to the fuel cell stack, together with the temperature differential between the fuel cell stack and the thermal management fluid, may impact the rate of thermal energy exchange between the fuel cell stack and the thermal management fluid, and thus the temperature of the fuel cell stack.

For fuel cell stacks that are cooled by an ambient air stream, accurate control of the volumetric flow rate and/or the velocity of the air stream that comes into thermal contact with the fuel cell stack may be important to ensure accurate control of the fuel cell stack temperature. Since the rate of heat generation within the fuel cell stack may be a function of the rate of electrochemical reaction within the fuel cell stack and/or the power output from the fuel cell stack, and the rate of thermal energy transfer between the fuel cell stack and the air stream may be a function of the fuel cell stack temperature, the ambient air temperature, and the flow rate of the air stream to the fuel cell stack, the thermal management system may be designed to provide a broad range of air flow rates and thus ensure accurate fuel cell stack temperature control over the entire thermal energy generation and ambient condition operating ranges under which the fuel cell stack is designed to operate. Thus, a thermal management system that may provide sufficient cooling under worst-case, and/or maximum rated, conditions of maximum fuel cell stack thermal output and high ambient temperatures, as well as under conditions of low fuel cell stack thermal output and low ambient temperatures, may be desirable.

In order to ensure reliable temperature control over a broad range of conditions, the flow rate of the thermal management fluid into thermal contact with the fuel cell stack may be varied over a broad range, such as from between 1% and 100% of the maximum thermal management fluid flow rate. As an illustrative, non-exclusive example, a 5 kW fuel cell stack may operate under conditions in which thermal management fluid flow rates from 50 to 600 standard cubic feet per minute (SCFM) may be desired.

If the thermal management system is unable to provide this broad range of thermal management fluid flow rates, overcooling and/or undercooling of the fuel cell stack may result. Overcooling may cause the temperature of the fuel cell stack to decrease below an acceptable level, resulting in a decrease in fuel cell stack reaction kinetics and/or condensation of liquid water within the fuel cell stack, which may cause flooding of the fuel cell stack. Undercooling may cause the temperature of the fuel cell stack to increase to above an acceptable level, resulting in dehydration of the electrolytic membrane within the fuel cell stack, decreased reactant diffusion through the electrolytic membrane, and/or irreversible damage to fuel cell stack components.

It may be difficult to obtain this broad range of thermal management fluid flow rates without the use of complicated control systems and methods and/or multiple cooling devices. Thus, there exists a need for simple and reliable systems and methods of controlling the flow rate of thermal management fluid to the fuel cell stack under a broad range of operating conditions.

SUMMARY OF THE DISCLOSURE

The present disclosure is directed to systems and methods for regulating fuel cell air flow, such as during low loads and/or cold temperature operation. These systems and methods may include providing a thermal management fluid to the fuel cell stack, transferring thermal energy between the thermal management fluid and the fuel cell stack, and/or varying the flow rate of the thermal management fluid that comes into thermal contact with the fuel cell stack to maintain the temperature of the fuel cell stack within a desired temperature range. Varying the flow rate of the thermal management fluid may include varying the overall supply rate of the thermal management fluid within the fuel cell system and/or providing an alternative flow path for the thermal management fluid such that a portion of the thermal management fluid supplied by the fuel cell system does not come into thermal contact with the fuel cell stack. In some embodiments, varying the overall supply rate of the thermal management fluid within the fuel cell system may include varying the rotational frequency of an air drive assembly, such as a fan assembly. In some embodiments, varying the overall supply rate of the thermal management fluid within the fuel cell system may include partially or completely occluding a flow path for the thermal management fluid, thus increasing a resistance to thermal management fluid flow within the fuel cell system. In some embodiments, providing an alternative flow path for the thermal management fluid may include selectively diverting a portion of the thermal management fluid stream such that it does not come into thermal contact with the fuel cell stack. In some embodiments, the selectively diverting and/or the selective occluding may include a passive flow-regulating device that is configured to modify (or otherwise adjust or regulate) the flow rate of the thermal management fluid therethrough based at least in part on a variable associated with the thermal management fluid. In some embodiments, the variable associated with the thermal management fluid includes the pressure drop of the thermal management fluid across the flow-regulating device. In some embodiments, the regulating and/or varying of the flow rate of the thermal management fluid is automatic and/or without positive (active and/or computerized) control.

BRIEF DESCRIPTION OF THE DRAWINGS

FIG. 1 is a schematic representation of a fuel cell that may be utilized with the systems and methods according to the present disclosure.

FIG. 2 is a schematic representation of a fuel cell stack that may be utilized with the systems and methods according to the present disclosure.

FIG. 3 is a schematic representation of an illustrative, non-exclusive example of an energy producing and consuming assembly according to the present disclosure.

FIG. 4 is a schematic representation of an illustrative, non-exclusive example of a thermal management system utilizing a negative thermal management fluid pressure according to the present disclosure.

FIG. 5 is a schematic representation of an illustrative, non-exclusive example of a thermal management system utilizing a positive thermal management fluid pressure according to the present disclosure.

FIG. 6 is a schematic representation of an illustrative, non-exclusive example of another thermal management system utilizing a negative thermal management fluid pressure according to the present disclosure.

FIG. 7 is a less schematic cross-sectional view of an illustrative, non-exclusive example of another thermal management system according to the present disclosure showing a flow-regulating device in both the open and the closed configurations.

FIG. 8 is an exploded isometric view of an illustrative, non-exclusive example of a flow-regulating device that may be used in thermal management systems according to the present disclosure.

FIG. 9 is an illustrative, non-exclusive example of another flow-regulating device that may be used in thermal management systems according to the present disclosure.

FIG. 10 is an illustrative, non-exclusive example of another flow-regulating device that may be used in thermal management systems according to the present disclosure.

FIG. 11 is an illustrative, non-exclusive example of another flow-regulating device that may be used in thermal management systems according to the present disclosure.

FIG. 12 is an illustrative, non-exclusive example of another flow-regulating device that may be used in thermal management systems according to the present disclosure.

DETAILED DESCRIPTION AND BEST MODE OF THE DISCLOSURE

Figure 13:
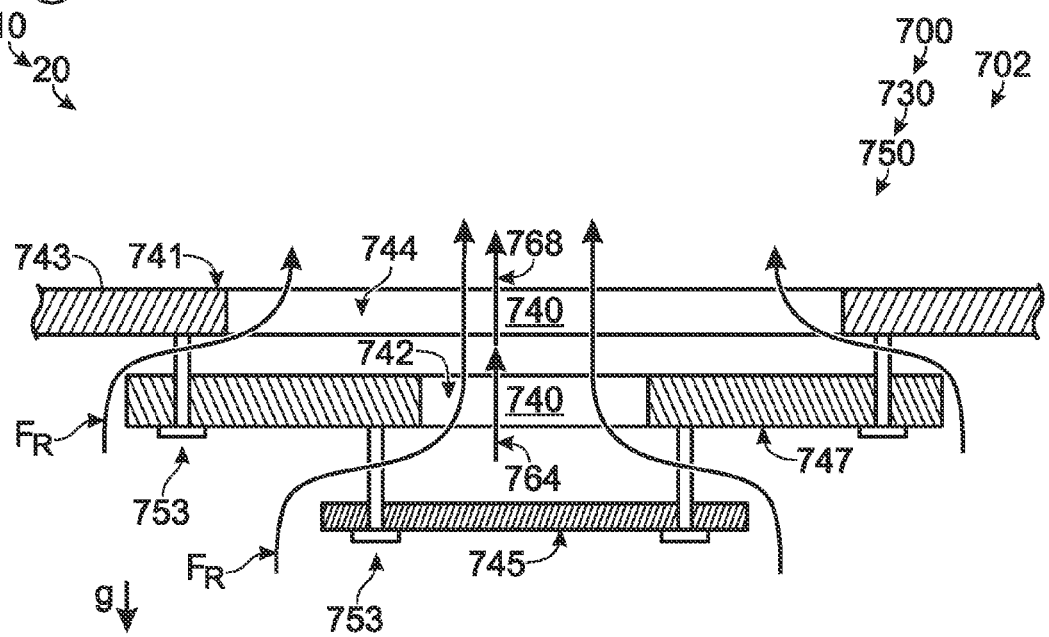
FIG. 13 is a fragmentary cross-sectional view of an illustrative, non-exclusive example of another flow-regulating device that may be used in thermal management systems according to the present disclosure, wherein the flow-regulating device may utilize two flow-restricting plates that may be opened by gravity, and further wherein both flow-restricting plates are shown in the open configuration.

The present disclosure is directed to systems and methods for regulating the temperature of a fuel cell during low load and/or cold temperature operation. As discussed in more detail herein, these systems and methods may include providing a thermal management fluid to the fuel cell stack, transferring thermal energy between the thermal management fluid and the fuel cell stack, and varying the flow rate of the thermal management fluid that comes into thermal contact with the fuel cell stack to maintain the fuel cell stack within an acceptable temperature range. Varying the flow rate of the thermal management fluid that comes into contact with the fuel cell stack may include varying the overall supply rate of the thermal management fluid within the fuel cell system and/or providing an alternative flow path for the thermal management fluid within the fuel cell system such that a portion of the thermal management fluid supplied by the fuel cell system does not come into thermal contact with the fuel cell stack.

An illustrative, non-exclusive example of a fuel cell 116 that may be utilized with the systems and methods according to the present disclosure is shown schematically in FIG. 1. Fuel cell 116 is described herein as being a polymer electrolyte and/or proton exchange membrane (PEM) fuel cell, but is it within the scope of the present disclosure that the systems and methods disclosed herein may be utilized with other types of fuel cells. The fuel cell may be described as forming a portion of an energy producing and consuming assembly, as generally indicated at 10, a portion of a fuel cell system, such as generally indicated at 20, a portion of a fuel cell assembly 100, and/or a portion of a fuel cell stack, such as generally indicated at 104. Proton exchange membrane fuel cells typically utilize a membrane-electrode assembly 119 including an ion exchange, or electrolytic, membrane 118 located between an anode region 122 and a cathode region 124. Each region 122 and 124 includes an electrode 120, namely an anode 126 (or anode electrode) and a cathode 128 (or cathode electrode), respectively, which may form a part of membrane electrode assembly 119. Each region 122 and 124 also may include a support 130, such as a supporting plate 132. Support 130 may form a portion of a bipolar plate assembly located between the membranes of adjacent fuel cells in a fuel cell stack. The supporting plates 132 of fuel cell 116 may be configured or otherwise utilized to carry the relative voltage potential resulting from the fuel cell reaction, such as in response to the applied load.

In operation, fuel supply system 300 supplies fuel 302 to the anode region from fuel source 304, while oxidant supply system 200 supplies oxidant 231 to the cathode region from oxidant source 202. Fuel 302 also may be referred to as supply fuel 302. A typical, but not exclusive, fuel for fuel cell 116 is hydrogen, and a typical, but not exclusive, oxidant is oxygen. As used herein, hydrogen refers to hydrogen gas and oxygen refers to oxygen gas. The following discussion may refer to fuel 302 as hydrogen 302 and oxidant 231 as oxygen 231, although it is within the scope of the present disclosure that other fuels and/or oxidants may be used. A suitable source of oxygen gas is air, such as from air proximate the fuel cell system. This air may be referred to herein as ambient air.

Hydrogen 302 and oxygen 231 may be delivered to the respective regions of the fuel cell, such as to anode flow fields 152 and cathode flow fields 154, respectively, via any suitable mechanism from respective sources 304 and 202. Illustrative, non-exclusive examples of suitable fuel sources 304 for hydrogen 302 include at least one pressurized tank, hydride bed or other suitable hydrogen storage device, and/or a fuel processor that produces a product, or hydrogen-rich, stream containing hydrogen gas. Illustrative, non-exclusive examples of suitable sources 202 of oxygen 231 include a pressurized tank of oxygen or air, or a fan, compressor, blower, or other device for directing air to the cathode region. Illustrative, non-exclusive examples of fuel supply systems 300 and oxidant supply systems 200 according to the present disclosure are disclosed in U.S. Pat. Nos. 5,861,137, 5,997,594, 6,221,117, 6,376,113, 6,375,906, 6,537,352, 6,890,672, 7,128,769, 7,135,048, 7,601,302, 7,632,322, and 7,659,019, as well as U.S. Patent Application Publication Nos. 2001/0045061, 2003/0192251, 2003/0223926, 2007/0264546, 2007/0266631, 2007/0274904, 2008/0138678, 2008/0222954, 2009/0155642, and 2010/0028223, the complete disclosures of which are hereby incorporated by reference.

Hydrogen and oxygen combine with one another within the fuel cell via an oxidation-reduction reaction. Although membrane-electrode assembly 119 restricts the passage of a hydrogen molecule, it will permit a hydrogen ion (proton) to pass therethrough, due largely to the ionic conductivity of membrane 118. The catalytic activity of the electrode material lowers the hydrogen dissociation energy, allowing the hydrogen gas to dissociate into protons and free electrons. The ionic potential gradient from the oxidation-reduction reaction at the membrane interface drives the protons through the ion exchange membrane. As membrane 118 also tends not to be electrically conductive, fuel cell output 101, in the form of a free electron flow, or electricity, 102, flows through energy delivery system 500 via an external circuit 502 to form energy delivery system electrical output 501, which is supplied to energy consuming/storing assembly 600. Also shown in FIG. 1 are an anode purge or exhaust stream 134, which may contain unreacted hydrogen gas, and a cathode purge or exhaust stream 136, which may contain unreacted oxygen gas.

In cathode region 124, electrons from the external circuit and protons from the membrane combine with oxygen to produce water and heat. While the amount of heat and electricity produced by the fuel cell stack may be dictated, at least in part, by the power output from the fuel cell system, a thermal management system may be utilized to control the fuel cell stack temperature to be within an acceptable range. Illustrative, non-exclusive examples of acceptable temperature ranges for PEM fuel cells according to the present disclosure include temperatures in the range of 20-100° C., including temperatures of 40-95° C., 50-90° C., 60-80° C., and 70-90° C., though other temperatures are also within the scope of the present disclosure. Since the amount of heat produced by the fuel cell stack may be a function of the power output from the fuel cell stack, the thermal management system may be designed to cool the fuel cell stack over an expected fuel cell stack heat output range (i.e., a range of thermal loads applied to the thermal management system) and match its cooling capacity to the heat output from the fuel cell stack. As used herein, heat output may refer to the thermal energy or heat generated by the fuel cell stack, while thermal load may refer to the cooling capacity required from the thermal management system in order to match the heat output of the fuel cell stack and control fuel cell stack temperature to be within the specified operating range.

As discussed, FIG. 1 is schematically illustrated. As will be evident, the other Figures are also schematically illustrated, with the Figures intended to provide illustrative, but non-exclusive, examples according to the present disclosure, and with the Figures not being intended to limit the scope of the present disclosure to a specific embodiment that is required to all systems and/or methods according to the present disclosure. The Figures are not intended to be drawn to scale, as they have been presented to emphasize and/or illustrate various aspects of the present disclosure. In the Figures, the same reference numerals designate like and corresponding, but not necessarily identical, elements through the various drawing Figures. Likewise in the Figures and corresponding textual disclosure, previously discussed subject matter and/or reference numerals may be presented in subsequent Figures and/or corresponding textual disclosure without repeating the discussion of such subject matter and/or reference numerals.

Unless indicated otherwise, elements illustrated in dashed lines, or indicated with dashed lead lines, are considered to be optional features, structures, and/or steps, while elements illustrated in solid lines, or indicated with solid lead lines, are typically included in the systems and methods disclosed herein. However, elements illustrated in dashed lines and/or those illustrated in solid lines may be omitted from a particular embodiment without departing from the scope of the present disclosure. In addition, the individual features, structures, and/or steps disclosed herein may be organized in any suitable fashion without departing from the scope of the present disclosure.

An illustrative, non-exclusive example of a fuel cell stack according to the present disclosure is shown in FIG. 2. A fuel cell stack 104 may contain a plurality of fuel cells 116 with bipolar plate assemblies 133 separating adjacent membrane-electrode assemblies 119. In this illustrative, but not exclusive, construction, the bipolar plate assemblies are supported between end plates 138 and provide an electrical pathway for free electrons to pass from the anode region of a first cell to the cathode region of an adjacent fuel cell via the bipolar plate assembly, thereby establishing an electrical potential through the fuel cell stack. This net flow of electrons produces an electric current that may be used to satisfy an applied load, such as from at least one of an energy-consuming device, an energy-storing device, balance of plant requirements of the fuel cell system itself, and/or the energy-consuming/storing assembly.

The individual fuel cells 116 of fuel cell stack 104 may have common, or shared, fuel (and/or oxidant) feeds, as well as common fuel cell stack purge and exhaust streams, and accordingly may include suitable fluid conduits and/or manifolds to deliver the associated streams to, and collect the streams from, the individual fuel cells. These conduits and/or manifolds may, but are not required to, be internal to fuel cell stack 104 and may be supplied by external connections to the fuel cell stack, such as anode inlet 140, which supplies fuel 302 to the fuel cell stack. After use within the fuel cell stack, the supplied fuel may exit the fuel cell stack via anode outlet 142 as anode exhaust stream 134. The fuel (and/or oxidant) feeds may additionally or alternatively be referred to as fuel (and/or oxidant) supplies.

It is within the scope of the present disclosure that the fuel cell stacks disclosed herein may include an open cathode design. When fuel cell stack 104 includes an open cathode design, oxidant 231 from oxidant supply system 200 and thermal management fluid 428 from thermal management system 400 may be supplied as a single, or common, stream from a single, or common, source, although it is also within the scope of the present disclosure for the oxidant and thermal management fluid to be supplied from separate sources and/or with separate delivery systems. As an illustrative, non-exclusive example, an air supply system 700 may supply an air stream 710 that may function as both thermal management fluid 428 and oxidant 231. Under these conditions, air supply system 700 may function as both thermal management system 400 and oxidant supply system 200. In contrast with the air supply system of an open cathode fuel cell stack, the fuel supply system may include a plurality of conduits both internal and external to the fuel cell stack that are configured to supply the fuel stream directly from a fuel source to the anode region of the individual fuel cells while avoiding contact between the fuel stream and the ambient environment.

It is within the scope of the present disclosure that this air stream may be supplied directly from the ambient environment proximal the fuel cell system and/or from any other suitable source. It is further within the scope of the present disclosure that this air stream may be supplied to the fuel cell stack with or without purification. Purification may include removing particulate, removing certain chemical species that may be detrimental to the operation of the fuel cell stack, and/or increasing the concentration of certain chemical species that may be utilized by the fuel cell stack, an illustrative, non-exclusive example of which includes oxygen.

As shown in FIG. 2, when fuel cell stacks 104 according to the present disclosure include an open cathode design, the fuel cell stack and/or bipolar plate assemblies may be designed and/or configured to provide a fluid flow path for the flow of the air stream directly into the cathode flow fields and into contact with the cathode electrode without first being supplied to a dedicated cathode inlet for the entire fuel cell stack, as shown in FIG. 2. The air stream provided to the cathode flow fields may both provide oxidant for the electrochemical reaction within the fuel cell stack and exchange thermal energy with the fuel cell stack, providing for the supply and/or removal of heat from the fuel cell stack.

It is also within the scope of the present disclosure that fuel cell stack 104 may include a closed cathode design, in which the fuel cell stack may further include cathode inlet 144 for supplying oxidant 231 from oxidant source 202 to the fuel cell stack, as well as cathode outlet 146 for discharging cathode exhaust stream 136 from the fuel cell stack, together with any suitable conduits, either internal to or external of the fuel cell stack, as described with respect to the fuel supply system.

When the fuel cell stack includes either an open or a closed cathode design, it is within the scope of the present disclosure that the fuel cell stack may include heat exchange structures 190 configured to improve the thermal energy transfer between thermal management fluid 428 and fuel cell stack 104. These structures may be dedicated heat exchange structures, such as fins, pins, heat exchangers, radiators, or any other suitable heat exchange structure, as well as dual-purpose structures, such as the cathode flow fields of the open cathode design. A substantial portion of the heat generated within the fuel cell stack may be absorbed by the thermal management fluid, which may remove this heat from the fuel cell stack. Similarly, it is within the scope of the present disclosure that the fuel cell stack may include heat exchange passages that are separate and distinct from the cathode regions and which are configured to provide for heat exchange between the heat exchange fluid (such as air) and the fuel cell stack (such as for cooling the stack). These heat exchange passages, when present, may take any suitable form, with illustrative, non-exclusive examples including flow passages through or between adjacent fuel cells, between adjacent support plates, and/or within support or bipolar plates.

The systems and methods disclosed herein may be utilized with any suitable fuel cell system. An illustrative, non-exclusive example of a fuel cell system 20 according to the present disclosure is shown schematically in FIG. 3. Therein, fuel supply system 300 may supply fuel 302, such as hydrogen gas, to fuel cell assembly 100, while oxidant supply system 200 may supply oxidant 231, and thermal management system 400 may supply thermal management fluid 428 to the fuel cell stack. The fuel cell assembly may generate an electrical output 101, such as electricity 102, and supply the electrical output via energy delivery system 500 to energy consuming/storing assembly 600, such as to satisfy an applied load, or demand, therefrom.

Fuel supply system 300 may include any suitable source 304 of fuel 302, such as hydrogen gas, and may be configured to generate and/or supply this fuel to fuel cell assembly 100, such as to fuel cell stack 104. Illustrative, non-exclusive examples of fuel supply systems 300 according to the present disclosure include a storage device 306 that contains a stored supply of hydrogen gas. Illustrative, non-exclusive examples of suitable storage devices 306 include tanks, hydride beds, or other suitable pressure vessels and sorption beds containing other hydrogen-adsorbing or absorbing materials such as sodium alanate, carbon nanotubes, or metal-organic polymers.

An additional or alternative illustrative, non-exclusive example of a suitable source 304 of hydrogen gas is the product stream from a fuel processor 308, which produces hydrogen gas by reacting at least one feed stream, such as a carbon-containing feedstock and/or water, to produce a product stream, such as a mixed gas stream, from which the stream containing hydrogen gas is formed. Illustrative, non-exclusive examples of fuel processors according to the present disclosure include steam reformers (which utilize feed stream(s) containing water and a carbon-containing feedstock), partial oxidation reactors (which utilize feed stream(s) containing air and a carbon-containing feedstock), and autothermal reactors (which utilize feed stream(s) containing water, air, and carbon-containing feedstock). Additional illustrative, non-exclusive examples of fuel processors 308 that may be utilized according to the present disclosure are disclosed in the references incorporated herein. Another illustrative, non-exclusive example of a suitable mechanism for producing hydrogen gas includes electrolysis, in which case the feed stream is water. Illustrative, non-exclusive examples of suitable carbon-containing feedstocks include at least one hydrocarbon or alcohol. Illustrative, non-exclusive examples of suitable hydrocarbons include methane, propane, natural gas, diesel, kerosene, gasoline, and the like. Illustrative, non-exclusive examples of suitable alcohols include methanol, ethanol, and polyols, such as ethylene glycol and propylene glycol.

Fuel supply system 300 may further include a purification region, or purification assembly, 310, that is configured to separate the mixed gas stream into at least a product hydrogen stream, which may contain a higher concentration of hydrogen gas and/or a lower concentration of other components than the mixed gas stream, and a byproduct stream, which may contain a lower concentration of hydrogen gas and/or a higher concentration of other components than the mixed gas stream. Illustrative, non-exclusive examples of purification regions 310 according to the present disclosure include any suitable pressure swing adsorption assembly, membrane separation assembly, water gas shift reactor, methanation catalyst bed, and/or the like. Illustrative, non-exclusive examples of purification assemblies and/or methods are disclosed in U.S. Pat. Nos. 3,564,816, 3,986,849, 4,331,455, 5,441,559, 6,152,995, 6,319,306, 6,419,728, 6,494,937, 6,497,856, 6,547,858, 6,562,111, 6,569,227, 6,596,057, 6,692,545, 7,160,367, 7,393,382, 7,399,342, and 7,416,569, as well as in U.S. Patent Application Publication Nos. 2008/0210088, 2009/0151249, and 2009/0151560 and U.S. Provisional Patent Application No. 61/287,601, as well as the other references incorporated herein, the complete disclosures of which are hereby incorporated by reference.

An energy producing and consuming assembly, which is illustrated generally in FIG. 3 at 10, includes at least one fuel cell assembly 100 and at least one energy-consuming/storing assembly 600, which is configured to exert an applied load to, or upon, the fuel cell system, and which also may be referred to herein as a load applying assembly. The at least one energy-consuming/storing assembly 600 may be electrically coupled to the fuel cell, or more typically, the fuel cell stack, either directly or through energy delivery system 500. Energy-consuming/storing assembly 600 may apply a load to the cell/stack/system and may draw an electric current therefrom to satisfy the load. Energy-consuming/storing assembly 600 may include at least one energy-storage device 602, such as one or more batteries 606, capacitors, ultracapacitors, and/or flywheels, which, when present, may at least temporarily store at least a portion of the electrical output produced by the fuel cell stack. Additionally or alternatively, energy-consuming/storing assembly 600 may include at least one energy-consuming device 604, which is an electrically powered device that consumes, or utilizes, at least a portion of the electrical output to power the device.

As discussed in more detail herein, oxidant supply system 200 may be separate from or integral with thermal management system 400, such as when oxidant supply system 200 and thermal management system 400 form a portion of air supply system 700. Thus, oxidant supply system 200 may supply oxidant 231 to fuel cell assembly 100, and thermal management system 400 may supply a separate thermal management fluid 428 to the fuel cell assembly. Alternatively, air supply system 700 may supply an air stream 710, which may serve as both oxidant 231 and thermal management fluid 428. Illustrative, non-exclusive examples of air supply systems 700 according to the present disclosure, such as which may form a portion of energy producing and consuming assembly 10 and/or fuel cell system 20 and/or which may form at least a portion of an oxidant supply system 200 and/or thermal management system 400, are shown in FIGS. 4-7. These may include negative pressure air supply systems 702, as illustrated in FIGS. 4, 6, and 7, as well as positive pressure air supply systems 704, as illustrated in FIG. 5. As used herein, negative pressure air supply systems 702, which also may be referred to as negative pressure systems 702, refer to air supply systems that, while in operation, develop, maintain, generate, create, and/or otherwise produce a negative pressure relative to atmospheric pressure (i.e., a pressure that is below atmospheric pressure proximate the fuel cell stack) between the fuel cell stack and a fan or other air drive assembly that is configured to provide a motive force to a fluid stream that flows therethrough, namely, to propel, blow, or otherwise cause flow of the fluid stream. Conversely, positive pressure air supply systems 704, which also may be referred to as positive pressure systems 704, refer to air supply systems that, while in operation, develop, maintain, generate, create, and/or otherwise produce a positive pressure (relative to the atmospheric pressure proximate the fuel cell stack) between the fuel cell stack and the air drive assembly.

As discussed in more detail herein, reliable and/or accurate control of the temperature of fuel cell stack 104 over a wide range of operating conditions may improve the operational performance and/or service life of the fuel cell stack. This temperature control may be improved by accurately controlling the flow rate of a thermal management fluid stream, such as an air stream, supplied thereto, such as by controlling a flow rate, $F_S$, of a stack air stream 705 that flows through the fuel cell stack.

In FIGS. 4-7, an air drive assembly 720 may provide a motive force to an air drive assembly stream 707 that flows through the air drive assembly. The flow rate, $F_D$, of air drive assembly stream 707 through air drive assembly 720 may be described as the sum of the flow rate, $F_S$, of stack air stream 705 and the flow rate, $F_R$, of (any) bypass stream 706 that may form a portion of the air drive assembly stream but that does not pass through the fuel cell stack. Thus, the flow rate of stack air stream 705 through the fuel cell stack may be controlled by varying the flow rate of bypass stream 706 and/or by varying the flow rate of air drive assembly stream 707 through the air drive assembly, such as by varying the rotational frequency of the air drive assembly and/or by varying the area for air flow through flow regulating devices 730 (as discussed in more detail herein). Bypass stream 706 may be described as being associated with the stack air stream and/or the air drive assembly stream, as the bypass stream may form at least a portion of the air drive assembly stream, may be separated from the air drive assembly stream, and/or may be combined with the stack air stream.

An illustrative, non-exclusive example of an air supply system 700 according to the present disclosure, in the form of a negative pressure air supply system, is shown schematically in FIG. 4 and is indicated generally at 702. The negative pressure system 702 of FIG. 4 may include a fuel cell stack 104, which as discussed herein may include a plurality of fuel cells 116. The negative pressure system further may include at least one flow-regulating device 730, as well as air drive assembly 720, which is located downstream from fuel cell stack 104 and which is configured to provide a motive force to air drive assembly stream 707.

Air drive assembly 720 may include any suitable structure configured to provide a motive force to, pressurize, and/or depressurize air drive assembly stream 707. Illustrative, non-exclusive examples of air drive assemblies 720 according to the present disclosure include any suitable fan, blower, compressor, impeller, ejector, and the like. The air drive assembly may be a single-speed device or a multiple-speed device and may include a plurality of air drive assembly operational states, including at least an "on" state, in which the air drive assembly is providing a motive force to the air stream, and an "off" state, in which the air drive assembly is not providing a motive force to the air stream. As used herein, a single-speed air drive assembly may include the two air drive assembly operational states described above, while a multiple-speed air drive assembly may include, in addition to the on and off states, a plurality of additional air drive assembly operational states in which the rotational frequency of the air drive assembly is varied over a given range.

As an illustrative, non-exclusive example, a multiple-speed air drive assembly according to the present disclosure may include a plurality of discrete on, or operational, states that correspond to different rotational frequencies, such as, for example, low, medium, and high states, in which the rotational frequency of the low state is less than the rotational frequency of the medium state, which is less than the rotational frequency of the high state, for example, 30%, 60%, and 100% of the maximum rotational frequency, respectively. As another illustrative, non-exclusive example, a multiple-speed air drive assembly according to the present disclosure may include an infinitely variable rotational frequency between specified ranges, such as, for example, from 0% to 100% of the maximum rotational frequency.

Air drive assemblies 720 according to the present disclosure may be manually, electronically, and/or mechanically controlled. As an illustrative, non-exclusive example of an electronic control system according to the present disclosure, the fuel cell system of FIG. 4 may include a controller 800 configured to control the operation of at least air drive assembly 720, such as by controlling the rotational frequency of the air drive assembly, based at least in part on a variable associated with the fuel cell system, such as the temperature of fuel cell stack 104 and/or the stoichiometry of the electrochemical reaction within the fuel cell stack. Illustrative, non-exclusive examples of controllers 800 according to the present disclosure are described in U.S. Pat. Nos. 6,383,670, 6,495,277, 6,811,908, 6,835,481, 6,979,507, 7,208,241, and 7,390,587, as well as in U.S. Patent Application Publication Nos. 2005/0266284, 2005/0266285, 2006/0024540, 2006/0134473, and 2008/0176118, the complete disclosures of which are hereby incorporated by reference.

Flow-regulating device 730 may include any suitable structure configured to control, modify, start, and/or stop the flow of air stream 710 through the flow-regulating device, and thus control, modify (increase or decrease), start (permit), and/or stop (restrict) the flow of the air stream through fuel cell stack 104, such as to heat or cool the fuel cell stack. Illustrative, non-exclusive examples of flow-regulating devices 730 according to the present disclosure include any suitable variable restriction device, such as a damper or variable orifice device that is configured to regulate or otherwise control the flow rate of air stream 710 through the flow-regulating device over a plurality of flow rates, as well as any suitable discrete flow restriction device, such as a fixed orifice or an orifice and blocking plate assembly, that is configured to control the flow rate of air stream 710 through the flow-regulating device by providing one or more discrete restrictions to the flow rate of the air stream through the flow-regulating device. As an illustrative, non-exclusive example, variable restriction devices according to the present disclosure may be configured to vary (such as by increasing or decreasing and/or by providing or obstructing) an area, opening, or other passage or orifice for air flow through the device, and thus the flow rate of air through the device, over a range of areas and/or flow rates, such as from 0% to 100% of the maximum area or flow rate, including 1%-100%, 5%-100%, 10%-100%, 5%-95%, and 25%-100% of the maximum area or flow rate.

Discrete restriction devices according to the present disclosure may be configured to provide a single or a plurality of discrete restrictions to the area for air flow therethrough. Illustrative, non-exclusive examples of discrete restriction devices according to the present disclosure include devices that include a single flow restriction and may restrict the area for air flow by a specific percentage, such as any percentage from 1%-99%, including at least 20%, 40%, 60%, 80%, 20-40%, 30-60%, 40-70%, and 50-90%, as well as devices that provide either 0% or 100% of the maximum area or flow rate. Illustrative, non-exclusive examples of devices that may provide a plurality of discrete restrictions include devices that may provide a plurality of discrete restrictions between 0% and 100%, including 0%, 100%, and at least a first intermediate restriction that is between 0% and 100%, such as a restriction of 20%, 40%, 60%, 80%, 20-40%, 30-60%, 40-70%, and 50-90%, of the maximum area for air flow. Illustrative, non-exclusive examples of discrete restriction flow-regulating devices according to the present disclosure are discussed in more detail herein.

Flow-regulating devices 730 according to the present disclosure may be present at any suitable location within fuel cell system 20 and/or with respect to fuel cell stack 104. These suitable locations may include locations in which the flow-regulating device is upstream of the air drive assembly and/or the fuel cell stack, as well as locations in which the flow-relating device is downstream of the air drive assembly and/or the fuel cell stack. As used herein, the terms "upstream" and "downstream" refer to the general direction of fluid flow between the corresponding components. Accordingly, and as an illustrative, non-exclusive example, a flow-regulating device that is upstream of the air drive assembly and downstream of the fuel cell stack means that an air stream flows from and/or through the fuel cell stack to the flow-regulating device and then to the air drive assembly.

FIGS. 4 and 5 graphically depict illustrative, non-exclusive examples of suitable relative positions for flow-regulating devices 730 according to the present disclosure. The specific illustrative examples are numbered 731-738, but it should be understood that these specific examples are still within the scope of the more general flow-regulating devices 730 that are described and/or illustrated herein. As an illustrative, non-exclusive example, flow-regulating device 731 may be located upstream of fuel cell stack 104 and may be configured to control the flow of stack air stream 705 through the fuel cell stack. As another illustrative, non-exclusive example, flow-regulating device 732 may be located downstream from the fuel cell stack but upstream of air drive assembly 720 and may be configured to control the flow of the stack air stream exiting the fuel cell stack and/or the flow of an air drive assembly stream 707. As yet another illustrative, non-exclusive example, flow-regulating device 734 may be located downstream of the air drive assembly and may be configured to control the flow rate of air drive assembly stream 707 exiting the air drive assembly.

As another illustrative, non-exclusive example, flow-regulating device 733 may be located downstream from fuel cell stack 104 but upstream of air drive assembly 720 and may be configured to provide an alternative, or parallel, flow path for bypass stream 706 to flow through the air drive assembly without first passing through the fuel cell stack, thereby creating an air drive assembly stream 707 that includes both stack air stream 705 and bypass stream 706. In this configuration, air drive assembly stream 707 also may be referred to as a combined stream 707, a combined air stream 707, a combined fluid stream 707, a composite stream 707, a composite air stream 707, and/or a composite fluid stream 707 even though the air drive assembly stream may only include bypass stream 706 when bypass stream 706 flows through flow-regulating device 733 and/or even though the air drive assembly stream may only include the bypass stream a portion of the time. The negative pressure between fuel cell stack 104 and air drive assembly 720 may provide a motive force for bypass stream 706 to pass through flow-regulating device 733 and combine with stack air stream 705 before passing through the air drive assembly. As discussed in more detail herein, this negative pressure also may provide a motive force for the passive actuation of flow-regulating device 733 between at least an open configuration, in which bypass stream 706 may pass through flow-regulating device 733, and a closed configuration, in which the bypass stream may not pass through flow-regulating device 733.

Flow-regulating device 733 further may include a plurality of partially occluded configurations, providing for a plurality of flow rates between 0% and 100% of the maximum flow rate to pass therethrough, as discussed in more detail herein. Thus, when the flow rate of stack air stream 705 is low, such as may be the case when the cooling needs, or demands, of fuel cell stack 104 are low (i.e., the fuel cell stack heat output is low and/or the thermal load applied to the thermal management system is low), the negative pressure between fuel cell stack 104 and air drive assembly 720 may be low and flow-regulating device 733 may be in an open configuration, providing a fluid flow pathway for bypass stream 706 to pass therethrough and decreasing the flow rate of stack air stream 705 for a given flow rate of air drive assembly stream 707 through air drive assembly 720. At higher fuel cell stack cooling needs (i.e., high fuel cell stack heat output or high thermal load), the magnitude of the negative pressure may increase due to an increased flow rate of air drive assembly stream 707, causing flow-regulating device 733 to transition from the open configuration to at least one of a partially occluded and a closed configuration, and increasing the proportion of air drive assembly stream 707 that flows through the fuel cell stack as stack air stream 705.

Additionally or alternatively, flow-regulating devices 731, 732, and 734 may be configured to close or partially close when the flow rate of the air stream therethrough is low, and to open when the flow rate of the air stream therethrough is high. This may serve to block, restrict, or otherwise occlude the flow of stack air stream 705 past fuel cell stack 104 when fuel cell stack cooling needs are low, decreasing the potential for overcooling, water condensation, and/or flooding of the fuel cell stack.

Flow-regulating devices 730 according to the present disclosure may be active devices that may be manually, electronically, and/or mechanically controlled and/or may be passive devices. As used herein, active devices refers to devices that may change configuration responsive to electronic, mechanical, hydraulic, pneumatic, and/or other control signals generated by a controller. In contrast, passive devices refers to devices that may change configuration based on an inherent property of the device and/or the device's environment without the use of, and/or the need for, a separate control system, control logic to generate a control signal, and/or actuators to receive the control signal and change the configuration of the flow-regulating device.

As an illustrative, non-exclusive example, flow-regulating devices 730 may include active devices and controller 800 may actively control the area for air flow through flow-regulating device 734 based at least in part on a variable associated with fuel cell system 20 such as, for example, the temperature of fuel cell stack 104 and/or the stoichiometry of the electrochemical reaction within the fuel cell stack. As another illustrative, non-exclusive example, flow-regulating devices 730 may include passive devices and the area for air flow through the flow-regulating device may vary passively based on a variable associated with fuel cell system 20, such as a variable associated with air stream 710 flowing therethrough.

As illustrative, non-exclusive examples, the variable associated with air stream 710 may be or include the velocity of the air stream, the pressure of the air stream, a pressure of the stack air stream, a pressure of the bypass stream, a pressure of the air drive assembly stream, an ambient pressure of the ambient environment proximal to the fuel cell assembly, and/or any suitable differential pressure, illustrative, non-exclusive examples of which include a differential pressure of the bypass stream across the flow-regulating device, a differential pressure of the stack cooling stream across the fuel cell stack, a differential pressure of the air drive assembly stream across the air drive assembly, and/or a differential pressure between the bypass stream and the ambient pressure.

The air supply system 700 of FIG. 5 is substantially similar to the air supply system 700 described above with reference to FIG. 4 with the exception that it is a positive pressure air supply system. The positive pressure air supply system is generally indicated at 704 in FIG. 5. As discussed in more detail herein, a positive pressure system develops a positive air pressure relative to atmospheric pressure between the air drive assembly and the fuel cell stack. As shown in FIG. 5, air drive assembly 720 may be located upstream of the fuel cell stack in a positive pressure system. In positive pressure air supply system 704 of FIG. 5, the operation of flow-regulating devices 735, 736, and 738 may be substantially similar to the operation of flow-regulating devices 731, 732, and 734 of FIG. 4, such as to at least partially occlude the flow rate of the air stream therethrough at low air stream flow rates but not at high air steam flow rates, and will not be discussed in greater detail herein.

Flow-regulating device 737 may serve a similar purpose to that of flow-regulating device 733 of FIG. 4 by selectively providing a fluid flow pathway for a portion of air drive assembly stream 707 to bypass fuel cell stack 104 as bypass stream 706, thus decreasing the flow rate of stack air stream 705. Similar to the discussion contained herein with reference to the negative pressure embodiment of FIG. 4, air drive assembly stream 707 of the positive pressure embodiment of FIG. 5 also may be referred to as a combined stream 707, a combined air stream 707, a combined fluid stream 707, a composite stream 707, a composite air stream 707, and/or a composite fluid stream 707 even though the air drive assembly stream may only include bypass stream 706 when bypass stream 706 flows through flow-regulating device 737 and/or even through the air drive assembly stream may only include the bypass stream a portion of the time.

The positive pressure between air drive assembly 720 and fuel cell stack 104 may provide a motive force for the passive actuation of flow-regulating device 737. As an illustrative, non-exclusive example, flow-regulating device 737 may be configured to open under the influence of gravity and close and/or decrease the flow rate of bypass stream 706 when the positive pressure between the air drive assembly and the fuel cell stack exceeds a predetermined value. This may provide a fluid flow path for a portion of air drive assembly stream 707 to bypass the fuel cell stack at low positive pressures that may be associated with low air drive assembly stream 707 flow rates generated by the air drive assembly when the cooling needs of the fuel cell stack are low, thus avoiding overcooling of the fuel cell stack. In contrast, as the positive pressure is increased due to an increase in the flow rate of air drive assembly stream 707 due to an increased demand for cooling by the fuel cell stack, flow-regulating device 737 may transition from an open configuration to a partially and/or fully occluded/closed configuration, wherein the flow rate of bypass stream 706 is decreased and a larger proportion of air drive assembly stream 707 flows through fuel cell stack 104 as stack air stream 705.

While FIGS. 4 and 5 illustrate a single fuel cell stack and a single air drive assembly, it is within the scope of the present disclosure that any suitable number, size, and/or capacity of drive assemblies may be utilized. This may include the use of several similar and/or identically sized drive assemblies as well as the use of drive assemblies of varying size and/or capacity that may be suitable for different air drive assembly stream flow rates and/or fuel cell stack cooling needs. It is also within the scope of the present disclosure that several air drive assemblies may be arranged in series, parallel, and/or series/parallel configurations and/or that the air supply system may be designed to operate in a positive pressure configuration at least a portion of the time and a negative pressure configuration at least a portion of the time, such as may be accomplished by combining the configuration of FIG. 4 with the configuration of FIG. 5.

In addition, and while FIGS. 4 and 5 only illustrate a single flow-regulating device at each of several optional locations within the air supply system, it is within the scope of the present disclosure that a plurality of flow-regulating devices may be utilized. This may include a plurality of flow-regulating devices arranged in parallel, as well as individual flow-regulating devices that include multiple, parallel flow paths, as discussed in more detail herein. Moreover, it is within the scope of the present disclosure that a single air supply system may be utilized to provide one or more air streams to two or more fuel cell stacks. In addition, while the various elements contained within FIGS. 4 and 5 are indicated at a specific location, the location of these elements may vary without departing from the scope of the present disclosure.

Another illustrative, non-exclusive example of an air supply system 700 in the form of a negative pressure air supply system 702 according to the present disclosure is shown schematically in FIG. 6. In FIG. 6, stack air stream 705 is supplied to fuel cell stack 104 and optionally combines with bypass stream 706 before flowing through air drive assembly 720 as air drive assembly stream 707 and exiting from air supply system 700. As discussed in more detail herein, flow-regulating device 730 may control the flow rate of the bypass stream therethrough, controlling the proportion of air drive assembly stream 707 that bypasses the fuel cell stack. As also discussed in more detail herein, flow-regulating device 730 may be configured to control the flow rate of bypass stream 706 therethrough responsive to a variable associated with the air supply system and may be actively and/or passively controlled.

As an illustrative, non-exclusive example, flow-regulating device 730 may be configured to provide for the flow of bypass stream 706 therethrough at low flow rates of air drive assembly stream 707 but restrict the flow of the bypass stream at higher flow rates of air drive assembly stream 707. This may provide a lower overall flow rate of stack air stream 705 for low air drive assembly stream flow rates, decreasing the minimum flow rate of stack air stream 705 that may be obtained with a given air drive assembly and decreasing the potential for overcooling of the fuel cell stack, while also providing a mechanism by which the entire air drive assembly stream may be utilized to cool the fuel cell stack at higher air drive assembly stream flow rates. This may provide an air supply system that is configured to cool the fuel cell stack with a wider range of stack air stream flow rates than may be obtained in a system that does not include flow-regulating device 730.

As discussed in more detail herein, the fuel cell stack 104 of FIG. 6 may include an open cathode, air-cooled fuel cell stack. As also discussed in more detail herein, air drive assembly 720 may include any suitable structure configured to provide a motive force to the air (and/or other thermal management fluid) as it flows therethrough, illustrative, non-exclusive examples of which include an impeller and/or fan assembly 725. Flow-regulating device 730 according to the present disclosure may include an orifice and plate assembly 750 that includes an orifice 740 and a plate 745. Plate 745 may additionally or alternatively be referred to as a barrier, gate, and/or partition, with assembly 750 being renamed accordingly.

FIG. 7 provides illustrative, non-exclusive examples of fuel cell systems 20 that include air supply systems 700 in the form of negative pressure air supply systems 702 that may include orifice and plate assembly 750 according to the present disclosure. In FIG. 7, air drive assembly 720, such as fan assembly 725, may provide a motive force to draw air stream 710 through fuel cell stack 104, while air flow conduit 741 may control, contain, and/or otherwise constrain the flow of air stream 710 through the air supply system.

As shown in dashed lines in FIG. 7, it is within the scope of the present disclosure that the negative pressure between fuel cell stack 104 and fan assembly 725 may be insufficient to transition (or bias or propel) plate 745 into contact with orifice 740 and transition orifice and plate assembly 750 to the closed configuration. Thus, air drive assembly stream 707 may include both stack air stream 705 and bypass stream 706; the flow rate of stack air stream 705 through fuel cell stack 104 may be less than the total flow rate of air drive assembly stream 707; and the flow rate of stack air stream 705 may be controlled both by the flow rate of bypass stream 706 through flow-regulating device 730 and the rotational frequency of fan assembly 725.

In contrast, and as shown in dash-dot lines in FIG. 7, it is also within the scope of the present disclosure that the negative pressure between fuel cell stack 104 and fan assembly 725 may be sufficient to transition (or bias or propel) orifice and plate assembly 750 to the closed configuration. Thus, the flow of bypass stream 706 may be occluded, the flow rate of stack air stream 705 may be approximately equal to the flow rate of air drive assembly stream 707, and the flow rate of air stream 710 past fuel cell stack 104 may be controlled primarily by the rotational frequency of fan assembly 725.

As discussed in more detail herein, the configuration of orifice and plate assembly 750 between at least the open configuration and the closed configuration may include passive control of the configuration based on a pressure differential across the assembly and/or an air flow rate therethrough. Thus, the configuration of the orifice and plate assembly may be determined based on a force balance between a restoring force that is configured to bias the plate in one direction and the forces applied to the plate by the pressure differential across the assembly and/or the air flow rate through the assembly. The restoring force may include any suitable force configured to bias the plate in one direction, including the force of gravity acting on the mass of the plate (which may be proportional to the mass of the plate, m, multiplied by the gravitational constant, g), as well as a biasing force applied by a suitable biasing mechanism, illustrative, non-exclusive examples of which include any suitable spring, elastomeric material, magnetic force, electromagnetic force, or other suitable biasing mechanism. The forces applied to the plate by the pressure differential across the plate may include the pressure force itself (which may be proportional to the area of the orifice opening, A, multiplied by the pressure differential across the plate, $\Delta P$), as well as the viscous forces associated with the flow of air through the orifice and plate assembly.

As an illustrative, non-exclusive example, the restoring force may be provided by the force of gravity and the viscous forces associated with the flow of air through the orifice may be assumed to be small relative to the forces applied to the plate by the pressure differential across the plate. Under these conditions, the pressure differential at which orifice and plate assembly 750 may transition from an open configuration to a closed configuration may be approximated by the formula:

$$\Delta P = m^*g/A$$

Thus, the desired pressure differential at which the transition from the open configuration to the closed configuration takes place may be controlled by varying the mass of plate 745 and/or the area of orifice 740. Illustrative, non-exclusive examples of pressure differentials according to the present disclosure include pressure differentials from 100 to 10,000 Pascals (Pa), including pressure differentials of at least 250, 500, 750, 1000, 1250, and 1500 Pascals, although pressure differentials of greater than 10,000 Pascals as well as pressure differentials of less than 100 Pascals are also within the scope of the present disclosure. The orifice and plate assembly described above may improve system reliability and coolant flow control by providing a system in which control of the valve configuration may be passive and governed only by the pressure differential across the valve and the gravitational forces acting on the valve. In addition, the minimum obtainable stack air stream 705 flow rate, $F_S$, may be decreased significantly from that obtainable without the use of orifice and plate assembly 750, thus providing temperature control of the fuel cell stack over a wider range of air flow rates than might be obtained without the use of the orifice and plate assembly and decreasing the likelihood of overcooling the fuel cell stack.

FIGS. 8-14 provide illustrative, non-exclusive examples of flow-regulating devices 730 according to the present disclosure. These illustrative, non-exclusive examples may be used with any of the air supply systems 700, thermal management systems 400, oxidant supply systems 200, fuel cell systems 20, and/or energy producing and consuming assemblies 10 disclosed, illustrated, and/or incorporated herein. The flow-regulating devices of FIGS. 8-14 are passive flow-regulating devices that, as discussed in more detail herein, may change configuration based upon and/or responsive to an inherent property of the device and/or the device's environment.

FIG. 8 shows an exploded, three-dimensional projection of an illustrative, non-exclusive example of a flow-regulating device 730 including an orifice and plate assembly 750 according to the present disclosure. The orifice and plate assembly of FIG. 8 includes orifice 740 and plate 745. Plate 745 may be operatively attached to an orifice plate 743 using any suitable structure configured to provide a mechanism for plate 745 to transition between at least an open configuration, in which air may flow through the orifice and plate assembly, and a closed configuration, in which air flow through the orifice and plate assembly may be occluded or blocked. Orifice plate 743 may form a portion of air-flow conduit 741 of the fuel cell system, in the sense that orifice 740 forms an opening (selectively sealable by plate 745) through which air may enter or exit, depending on the embodiment, an air conduit of an air supply system 700 for a fuel cell system, such as for a fuel cell stack thereof. Accordingly, orifice plate 743 may additionally or alternatively be referred to as a body, wall, or housing portion of an air-flow conduit 741.

As an illustrative, non-exclusive example, orifice and plate assembly 750 may include suitable guide structure 753 for guiding, regulating, and/or limiting the relative movement of plate 745 relative to orifice plate 743 and/or orifice 740. Guide structure 753 may be designed and/or configured to guide the relative movement of plate 745 between its open and closed configurations relative to orifice 740 and/or to limit the movement of plate 745 relative to the orifice. Illustrative, non-exclusive examples of such guide structure 753 include guide rods 755 and fasteners 760. Fasteners 760 may operatively attach plate 745 to orifice plate 743, while the plate may be slidingly retained by guide rods 755 between the open and the closed configurations. Guide rods 755 may additionally or alternatively be referred to as guides 755. Fasteners 760 may additionally or alternatively be referred to as retainers and/or detents, in that they may be configured to limit the degree to which the plate (or other cover, plug, baffle, or closure) of an orifice and plate assembly 750 may pivot, translate, or otherwise move away from the corresponding orifice 740, and thus away from the closed configuration. As discussed in more detail herein, the illustrative orifice and plate assembly of FIG. 8 may be configured to be biased to the open configuration by the force of gravity acting on plate 745 and may transition to the closed configuration responsive to the differential pressure across the orifice and plate assembly exceeding a predetermined threshold value. As an illustrative, non-exclusive example, plate 745 may include a sheet of flat, rigid plastic, orifice plate 743 may include a sheet metal orifice plate, and guide rods 755 may include cylindrical standoffs.

FIGS. 7-8 provide illustrative, non-exclusive examples of orifice and plate assemblies 750 according to the present disclosure that are configured to passively control the air flow through air supply system 700, such as by transitioning among a plurality of configurations, based at least in part on the pressure differential across the orifice and plate assembly. Numerous variations are possible without departing from the scope of the present disclosure.

FIG. 9 provides an illustrative, non-exclusive example of another orifice and plate assembly 750 that may be used with flow-regulating device 730 of an air supply system 700 according to the present disclosure, in which plate 745 is pivotally coupled to orifice plate 743. FIG. 9 illustrates this example in the context of a negative-pressure air delivery assembly 702, although this structure also may be used with positive-pressure air delivery assemblies if suitably oriented for movement responsive to a positive air (and/or differential) pressure instead of a negative pressure.

As illustrated, guide structure 753 includes at least one hinge 762 that pivotally couples plate 745 to orifice plate 743 of air-flow conduit 741 for pivotal movement between the open and closed configurations of the plate. Any suitable structure may be utilized for hinge 762, including living hinges that are integrally formed with at least one of plate 745 and orifice plate 743, rigid mechanical hinges that are separately formed and thereafter secured to plate 745 and orifice plate 743, resilient and/or flexible members that are secured to and which pivotally interconnect plate 745 and orifice plate 743, etc. In FIG. 9, guide structure 753 also includes at least one fastener 760 that is configured to limit the degree to which plate 745 may pivot away from orifice 740. Fastener 760, which as discussed additionally or alternatively may be referred to as a stop or retainer, may take any suitable form, and may be configured to engage any suitable portion of plate 745 to provide the movement-limiting function described herein.

In the example of FIG. 9, plate 745 is oriented to be biased to automatically pivot to its open configuration due to the weight of the plate. In other words, the force of gravity acting on the plate will bias the plate to its open configuration. Accordingly, plate 745 should be constructed and/or sized such that a corresponding threshold (minimum) negative pressure (or pressure differential) will be sufficient to cause the plate to pivot or otherwise move from its open configuration to its closed configuration. In other words, the plate and orifice assembly should be sized and/or constructed with consideration of a selected threshold (minimum) pressure that is sufficient to cause the plate to pivot or otherwise move from its open configuration to its closed configuration. This design consideration may apply to other orifice and plate assemblies 750 and/or flow-regulating devices 730 according to the present disclosure.

It is further within the scope of the present disclosure that some orifice and plate assemblies 750 may include a structural biasing mechanism 770 that is configured to bias plate 745 away from orifice 740, and thus to bias the plate away from its closed configuration and toward its open configuration. By "structural biasing mechanism," it is meant that the biasing mechanism is something other than the force of gravity acting upon the inherent weight of plate 745. Illustrative, non-exclusive examples of structural biasing mechanisms 770 include one or more springs (leaf, coil, extension, compression, etc.), elastomers, resilient members, compressible members, and the like. FIG. 9 schematically illustrates that a structural biasing mechanism 770 may optionally be used with the depicted example of an orifice and plate assembly 750. FIG. 10 provides an illustrative, non-exclusive example of an orifice and plate assembly 750 of a flow-regulating device in which the force of gravity biases the plate to its closed configuration, and in which a structural biasing mechanism 770 exerts a biasing force that is greater than the exerted gravitational force and thus retains the plate in its open configuration, at least until the plate is moved to its closed configuration responsive to the negative pressure, or pressure differential, described herein.

FIGS. 11 and 12 provide illustrative, non-exclusive examples of orifice and plate assemblies 750 of flow-regulating devices 730 in which the weight of plate 745 does not urge the plate toward or away from its closed configuration. In the illustrative examples, the plate is configured to move in a horizontal direction, or plane, between its open and closed configurations, although other orientations may be utilized without departing from the scope of the present disclosure. In FIG. 11, the plate is configured for translational movement between its open and closed configurations, whereas in FIG. 12 the plate is configured for pivotal movement between its open and closed configurations. The examples of FIGS. 11 and 12 typically will include guide structure 753 that includes a structural biasing mechanism 770, as this biasing mechanism will be configured to bias the plate away from its closed configuration when the air pressure, or pressure differential (that urges the plate to its closed configuration), is less than a threshold minimum pressure. Although FIG. 12 illustrates an embodiment in which the plate is configured to pivot about a vertical axis, it is within the scope of the present disclosure that plate 745 may alternatively be configured to pivot about an axis that is oriented in a horizontal or other direction.

Many variations on the above structures are within the scope of the present disclosure. As an illustrative, non-exclusive example, and as described in more detail herein with reference to FIG. 13, orifice and plate assemblies 750 according to the present disclosure may include a plurality of plate assemblies, a portion of which may include an orifice. As another illustrative, non-exclusive example, and as described in more detail herein with reference to FIG. 14, air supply systems 700 with a flow-regulating device 730 with orifice and plate assemblies 750 according to the present disclosure may be configured to be biased to the closed configuration by the force of gravity, or another restoring force, and open responsive to a pressure differential that is greater than a predetermined threshold value.

As yet another illustrative, non-exclusive example, when air supply systems 700 according to the present disclosure include a plurality of flow-regulating devices 730, such as orifice and plate assemblies 750, arranged in parallel, the flow-regulating devices may be designed to transition at least between the open and the closed configuration at the same and/or at different differential pressure threshold values. Thus, a portion of the orifice and plate assemblies may transition from one configuration to another at a first differential pressure threshold value, while the remainder may transition from one configuration to another at another and/or several other differential pressure threshold value(s). This may be accomplished, for example, by providing orifice and plate assemblies 750 with varying mass:area ratios, as discussed in more detail herein, and/or by varying the ratio of the restoring force to the differential pressure force in another manner.

As yet another illustrative, non-exclusive example, orifice and plate assemblies 750 according to the present disclosure may further include a sealing structure configured to decrease the leakage of air through the orifice and plate assembly when the assembly is in the closed configuration. This may include any suitable resilient material, illustrative, non-exclusive examples of which include an elastomer, foam, and/or rubber, as well as the use of specific shapes for the orifice and/or plate that serve to minimize leakage, such as flat mating surfaces and/or mating surfaces configured to self-align and/or provide a robust sealing surface.

An illustrative, non-exclusive example of an orifice and plate assembly 750 that may be biased to the open configuration by the force of gravity and which includes a stacked plate assembly with multiple orifices is shown in FIG. 13. The orifice and plate assembly of FIG. 13 may be substantially similar to the orifice and plate assemblies of FIG. 8 but may include a plate with an orifice 747, providing both first air flow path 764 through first orifice 742 and second air flow path 768 through second orifice 744. The orifice and plate assembly of FIG. 13 is shown with both air flow paths in the open configuration and may be designed such that one air flow path is blocked or occluded at a first differential pressure across the assembly, while another air flow path is blocked or occluded at a second differential pressure across the assembly. It is within the scope of the present disclosure that the second differential pressure may be the same as or different from the first differential pressure. This may allow fuel cell systems 20 that utilize the orifice and plate assembly of FIG. 13 a greater level of control over the flow rate of air through the assembly.

As an illustrative, non-exclusive example, the mass:area ratio of plate 745 may be selected such that plate 745 transitions from the open configuration to the closed configuration at a first differential pressure across the orifice and plate assembly. Similarly, the mass:area ratio of plate with an included orifice 747 may be selected such that it transitions from the open configuration to the closed configuration at a second differential pressure that is greater in magnitude than the first differential pressure. Selection of a specific mass:area ratio, and thus a specific differential pressure at which the assembly may transition between the open and the closed configurations, may be accomplished by utilizing different materials of construction, different material thicknesses, and/or different orifice areas as desired. In addition, any suitable number of plates with an included orifice may be stacked to provide the desired level of control over the air flow rate through the fuel cell stack, $F_S$.

Figure 14:
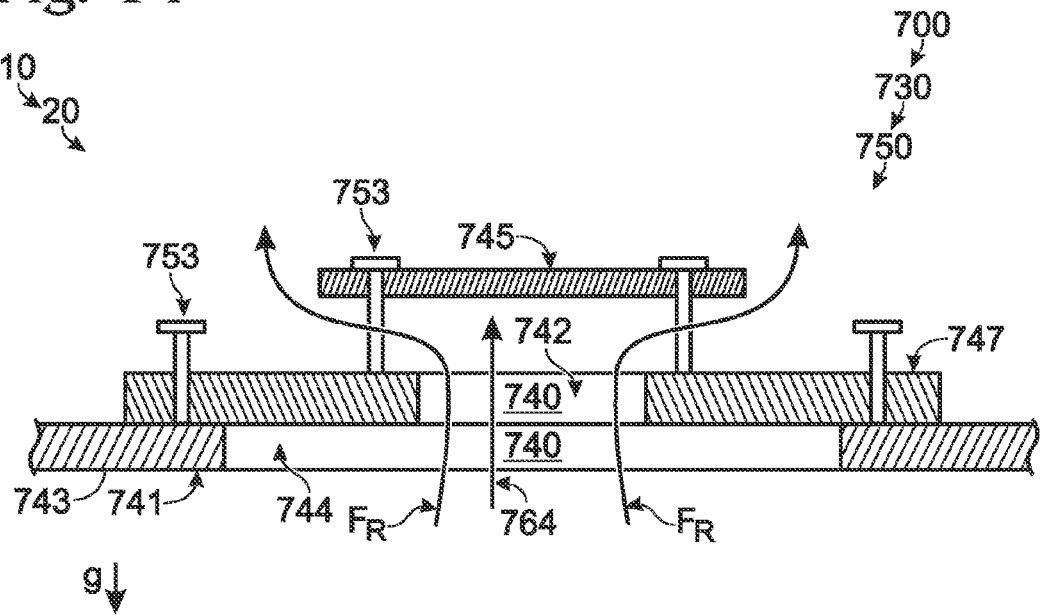
FIG. 14 is a cross-sectional view of an illustrative, non-exclusive example of yet another flow-regulating device that may be used in thermal management systems according to the present disclosure, wherein the flow-regulating device may utilize two flow-restricting plates that may be closed by gravity, and further wherein one flow-restricting plate is shown in the open configuration and one flow-restricting plate is shown in the closed configuration.

Another illustrative, non-exclusive example of an air supply system 700 with a flow-regulating device 730 that includes an orifice and plate assembly 750 according to the present disclosure is shown in FIG. 14. The structure of the assembly of FIG. 14 is substantially similar to that of FIG. 13, except that it is inverted such that the force of gravity may bias the assembly to the closed configuration, while a pressure differential across the valve assembly may serve to transition the assembly to the open configuration. In addition, the assembly of FIG. 14 illustrates a configuration in which the differential pressure across the valve assembly is sufficient to maintain plate 745 in the open configuration but not sufficient to maintain plate with an included orifice 747 in the open configuration.

Thermal management systems 400 disclosed herein have been described in the context of air supply system 700. However, it is within the scope of the present disclosure that the systems and methods disclosed herein may be utilized with any suitable thermal management fluid 428. When utilizing a thermal management fluid other than air, the previously described air supply systems 700 may be referred to as thermal management fluid supply systems 700. Furthermore, air drive assembly 720 also may be referred to as thermal management fluid drive assembly 720, air stream 710 also may be referred to as thermal management fluid stream 710, stack air stream 705 also may be referred to as stack thermal management fluid stream 705, and air drive assembly stream 707 also may be referred to as thermal management fluid drive assembly stream 707. It is further within the scope of the disclosure that bypass stream 706 may include any suitable thermal management fluid 428.

Illustrative, non-exclusive examples of thermal management fluids according to the present disclosure include air or another suitable gas, water, other non-conducting, non-corrosive liquids including ethylene glycol and propylene glycol, and/or refrigerants such as fluorocarbons, ammonia, sulfur dioxide, and methane. When the thermal management fluid is a liquid, it follows that a pump or other suitable fluid drive assembly for a liquid thermal management fluid will be used. In addition, the thermal management systems disclosed herein have been described with respect to cooling the fuel cell stack. However, it is within the scope of the present disclosure that the systems and methods described herein also may be utilized to heat the fuel cell stack. This may include generating heat within the fuel cell stack and/or supplying a heated air stream or other thermal management fluid stream to the fuel cell stack during periods in which the temperature of the fuel cell stack is less than the range of suitable operating temperatures.

The systems and methods disclosed herein have been described with respect to polymer electrolyte membrane fuel cell systems, including suitable operating temperature ranges appropriate for conventional PEM fuel cells. It is within the scope of the present disclosure that the systems and methods disclosed herein may be utilized with any suitable fuel cell system and/or with any other system that may benefit from these methods of regulating thermal management fluid flow. Illustrative, non-exclusive examples of fuel cell systems according to the present disclosure include direct methanol fuel cells, alkaline fuel cells, phosphoric acid fuel cells, high-temperature PEM fuel cells, molten carbonate fuel cells, and solid oxide fuel cells, though other types of fuel cells are also within the scope of the present disclosure. Illustrative, non-exclusive examples of suitable operating temperature ranges for fuel cell systems include operating temperatures in the range of 10-1500° C., including temperatures in the range of 20-70° C., 100-250° C., 150-200° C., 250-300° C., 600-700° C., and 900-1100° C., though other temperatures and temperature ranges are also within the scope of the present disclosure.

It is within the scope of the present disclosure that the systems, apparatus, and assemblies disclosed herein may be utilized with any suitable method and/or methods of operation. As an illustrative, non-exclusive example, a suitable method of operation may include using any of the systems, apparatus, and/or assemblies disclosed herein to control a flow rate of a thermal management fluid stream. As another illustrative, non-exclusive example, a suitable method of operation may include using any of the systems, apparatus, and/or assemblies disclosed herein to control the flow rate of a thermal management fluid, such as an air stream, that is supplied to a fuel cell stack.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any of the references that are incorporated by reference herein define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

As used herein the terms "adapted" and "configured" mean that the element, component, or other subject matter component is designed and/or intended to perform a given function. Thus, the use of the terms "adapted" and "configured" should not be construed to mean that a given element, component, or other subject matter is simply "capable of" performing a given function but that the element, component, and/or other subject matter is specifically created for the purpose of performing the function. It is also within the scope of the present disclosure that elements, components, and/or other recited subject matter that is recited as being adapted to perform a particular function may additionally or alternatively be described as being configured to perform that function, and vice versa.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A fuel cell system, comprising:
a fluid conduit;
a fuel cell stack in fluid communication with the fluid conduit, wherein the fuel cell stack is configured to receive a stack thermal management fluid stream that flows through the fluid conduit;
a flow-regulating device in fluid communication with the fluid conduit, wherein the flow-regulating device is configured to passively control a flow rate of a bypass stream associated with the fluid conduit, wherein the flow-regulating device includes at least an open configuration, in which the bypass stream may pass therethrough, and a closed configuration, in which at least a substantial portion of the bypass stream may not pass therethrough, and further wherein the flow-regulating device is configured to passively transition between the open configuration and the closed configuration responsive to a value of a variable associated with the fuel cell system; and
a thermal management fluid drive assembly in fluid communication with the fluid conduit, wherein the thermal management fluid drive assembly is configured to provide a motive force to a thermal management fluid drive assembly stream that flows through the fluid conduit, wherein the thermal management fluid drive assembly stream includes the stack thermal management fluid stream, and further wherein the thermal management fluid drive assembly stream includes the bypass stream at least when the flow-regulating device is in the open configuration.

A2. The fuel cell system of paragraph A1, wherein the bypass stream flows through the fluid conduit.

A3. A fuel cell system, comprising:
a fluid conduit;
a fuel cell stack in fluid communication with the fluid conduit, wherein the fuel cell stack is configured to receive a stack thermal management fluid stream that flows through the fluid conduit, and further wherein the fuel cell stack at least one of receives the stack thermal management fluid stream from the fluid conduit and supplies the stack thermal management fluid stream to the fluid conduit;
a flow-regulating device in fluid communication with the fluid conduit, wherein the flow-regulating device is configured to passively control a flow rate of a bypass stream, wherein the flow-regulating device at least one of receives the bypass stream from the fluid conduit and supplies the bypass stream to the fluid conduit, wherein the flow-regulating device includes an open configuration, in which the bypass stream may pass therethrough, and a closed configuration, in which at least a substantial portion of the bypass stream may not pass therethrough, and further wherein the flow-regulating device is configured to passively transition between the open configuration and the closed configuration responsive to a value of a variable associated with the fuel cell system; and
a thermal management fluid drive assembly in fluid communication with the fluid conduit, wherein the thermal management fluid drive assembly is configured to provide a motive force to a thermal management fluid drive assembly stream, wherein the thermal management fluid drive assembly at least one of receives the thermal management fluid drive assembly stream from the fluid conduit and supplies the thermal management fluid drive assembly stream to the fluid conduit, wherein the thermal management fluid drive assembly stream includes at least the stack thermal management fluid stream when the flow-regulating device is in the closed configuration, and further wherein the thermal management fluid drive assembly stream includes at least the stack thermal management fluid stream and the bypass stream when the flow-regulating device is in the open configuration.

A4. The fuel cell system of any of paragraphs A1-A3, wherein the fuel cell stack is configured to receive the stack thermal management fluid stream from the fluid conduit, the flow-regulating device is configured to receive the bypass stream from the fluid conduit, and the thermal management fluid drive assembly is configured to supply the thermal management fluid drive assembly stream to the fluid conduit.

A5. The fuel cell system of any of paragraphs A1-A4, wherein the thermal management fluid drive assembly is configured to create a positive pressure between the fuel cell stack and the thermal management fluid drive assembly.

A6. The fuel cell system of any of paragraphs A1-A3, wherein the fuel cell stack is configured to supply the stack thermal management fluid stream to the fluid conduit, the flow-regulating device is configured to supply the bypass stream to the fluid conduit, and the thermal management fluid drive assembly is configured to receive the thermal management fluid drive assembly stream from the fluid conduit.

A7. The fuel cell system of any of paragraphs A1-A3 or A6, wherein the thermal management fluid drive assembly is configured to create a negative pressure between the fuel cell stack and the thermal management fluid drive assembly.

A8. The fuel cell system of any of paragraphs A1-A7, wherein the flow-regulating device is configured to passively transition between the open configuration and the closed configuration responsive to the value of the variable associated with the fuel cell system exceeding a threshold value.

A9. The fuel cell system of paragraph A8, wherein the threshold value includes at least one of a threshold pressure and a threshold pressure differential of at least one of the stack thermal management fluid stream, the bypass stream, the thermal management fluid drive assembly stream, and an ambient pressure.

A10. The fuel cell system of paragraph A8 or A9, wherein the threshold value is a threshold pressure differential, and further wherein the threshold pressure differential includes at least one of a pressure differential across the flow-regulating device, a pressure differential across the fuel cell stack, a pressure differential across the thermal management fluid drive assembly, and a pressure differential between an interior of the fluid conduit and an exterior of the fluid conduit.

A11. The fuel cell system of paragraph A10, wherein the threshold pressure differential is between 100 and 10,000 Pa, and optionally wherein the threshold pressure differential is at least 250 Pa, 500 Pa, 750 Pa, 1000 Pa, 1250 Pa, or at least 1500 Pa.

A12. The fuel cell system of any of paragraphs A1-A11, wherein the flow-regulating device includes at least one of an orifice, a plate, an orifice plate, a plate with an orifice, an orifice and plate assembly, a guide rod, a guide structure, a fastener, the fluid conduit, a biasing mechanism, a seal, a sealing surface, and a hinge.

A13. The fuel cell system of any of paragraphs A1-A12, wherein the flow-regulating device is maintained in at least one of the open configuration and the closed configuration by at least one of gravity and a biasing mechanism.

A14. The fuel cell system of any of paragraphs A1-A13, wherein the flow-regulating device includes an orifice and plate assembly, and optionally wherein the orifice and plate assembly includes a plurality of guide rods configured to control a motion of a plate as it transitions between the open configuration and the closed configuration, and optionally wherein the orifice and plate assembly includes a plurality of fasteners configured to locate the plate relative to the orifice, and further optionally wherein the plate is configured to at least one of slidingly and pivotingly transition between the open configuration and the closed configuration.

A15. The fuel cell system of any of paragraphs A1-A14, wherein the fuel cell system includes a plurality of flow-regulating devices, and optionally wherein a first portion of the plurality of flow-regulating devices is configured to transition between the open configuration and the closed configuration at a different magnitude of the variable associated with the fuel cell system than a second portion of the plurality of flow-regulating devices.

A16. The fuel cell system of paragraph A15, wherein the plurality of flow-regulating devices includes a plurality of orifice and plate assemblies.

A17. The fuel cell system of any of paragraphs A1-A16, wherein the flow-regulating device includes a plurality of plate assemblies, wherein a portion of the plurality of plate assemblies includes an orifice, and further wherein the flow-regulating device is configured to provide a plurality of discrete flow restrictions to a flow rate of the bypass stream.

A18. The fuel cell system of any of paragraphs A1-A17, wherein, when the flow-regulating device is in the open configuration, a flow rate of the stack thermal management fluid stream is less than a flow rate of the thermal management fluid drive assembly stream.

A19. The fuel cell system of any of paragraphs A1-A18, wherein when the flow-regulating device is in the closed configuration, a flow rate of the stack thermal management fluid stream is equal or substantially equal to a flow rate of the thermal management fluid drive assembly stream.

A20. The fuel cell system of any of paragraphs A1-A19, wherein the stack thermal management fluid stream does not include the bypass stream.

A21. The fuel cell system of any of paragraphs A1-A20, wherein the fuel cell system includes a maximum flow rate of the stack thermal management fluid stream, wherein the fuel cell system is configured to provide a variable flow rate of the stack thermal management fluid stream, and optionally wherein the variable flow rate of the stack thermal management fluid stream is from 0%-100% of the maximum flow rate of the stack thermal management fluid stream, optionally including stack thermal management fluid stream flow rates from 1%-100%, from 5%-100%, from 10%-100%, and from 5%-95% of the maximum flow rate of the stack thermal management fluid stream.

A22. The fuel cell system of any of paragraphs A1-A21, wherein the fuel cell system includes a minimum flow rate of the stack thermal management fluid stream, and further wherein the minimum flow rate of the stack thermal management fluid stream is less than a minimum flow rate of the stack thermal management fluid stream in a comparable fuel cell system that does not include the flow-regulating device.

A23. The fuel cell system of any of paragraphs A1-A22, wherein the thermal management fluid drive assembly includes at least one of a fan, a vane, a pump, a compressor, an impeller, and an ejector.

A24. The fuel cell system of any of paragraphs A1-A23, wherein the thermal management fluid drive assembly includes a variable rotational frequency thermal management fluid drive assembly.

A25. The fuel cell system of any of paragraphs A1-A23, wherein the thermal management fluid drive assembly includes a single thermal management fluid drive assembly.

A26. The fuel cell system of any of paragraphs A1-A25, wherein the stack thermal management fluid stream, the bypass stream, and the thermal management fluid drive assembly stream include a thermal management fluid, and optionally wherein the thermal management fluid includes at least one of air, a gas, a liquid, water, ethylene glycol, propylene glycol, a refrigerant, a fluorocarbon, ammonia, sulfur dioxide, and methane.

A27. The fuel cell system of paragraph A26, wherein the thermal management fluid includes air, wherein the stack thermal management fluid stream is a stack air stream, wherein the thermal management fluid drive assembly is an air drive assembly, and further wherein the thermal management fluid drive assembly stream is an air drive assembly stream.

A28. The fuel cell system of any of paragraphs A1-A27, wherein the fuel cell stack includes at least one of an open cathode fuel cell stack, a polymer electrolyte membrane fuel cell stack, a molten carbonate fuel cell stack, and a solid oxide fuel cell stack, and optionally wherein the stack thermal management stream supplies an oxidant to the fuel cell stack, and further optionally wherein the fuel cell stack consumes at least a portion of the oxidant with a fuel and produces an electrical output therefrom.

A29. The fuel cell system of any of paragraphs A1-A28, in combination with a source of hydrogen gas configured to supply hydrogen gas to the fuel cell stack.

A30. A hydrogen-producing fuel cell system comprising:
the fuel cell system of any of paragraphs A1-A28; and
a hydrogen-producing region configured to provide a hydrogen gas stream to the fuel cell system.

A31. The hydrogen-producing fuel cell system of paragraph A30, wherein the hydrogen-producing region includes at least one of a hydrogen generation assembly, a reformer, a steam reformer, an autothermal reformer, a partial oxidation reformer, and an electrolysis unit.

A32. The hydrogen-producing fuel cell system of any of paragraphs A30-A31, wherein the hydrogen-producing region produces the hydrogen gas stream from a feedstock stream, and optionally wherein the feedstock stream includes at least one of water, an alcohol, methanol, ethanol, ethylene glycol, propylene glycol, a hydrocarbon, methane, ethane, propane, natural gas, diesel, kerosene, and gasoline.

A33. An energy-producing and consuming assembly comprising:
the fuel cell system of any of paragraphs A1-A32; and
an energy-consuming device.

A34. The energy-producing and consuming assembly of paragraph A33, wherein the energy-consuming device includes at least one of an electrical load, energy-storage device, a battery, a capacitor, and a thermal load.

B1. A fuel cell system, comprising:
a fluid conduit;
a fuel cell stack in fluid communication with the fluid conduit, wherein the fuel cell stack is configured to receive a stack thermal management fluid stream that flows through the fluid conduit;
means for automatically and passively controlling a flow rate of a bypass stream associated with the fluid conduit responsive to a value of a variable associated with the fuel cell system, wherein the means for automatically and passively controlling is in fluid communication with the fluid conduit;
a thermal management fluid drive assembly in fluid communication with the fluid conduit, wherein the thermal management fluid drive assembly is configured to provide a motive force to a thermal management fluid drive assembly stream that flows through the fluid conduit, wherein the thermal management fluid drive assembly stream includes the stack thermal management fluid stream, and further wherein the thermal management fluid drive assembly stream includes the bypass stream at least when the flow-regulating device is in an open configuration.

B2. The fuel cell system of paragraph B1, wherein the means for automatically and passively controlling the flow rate of the bypass stream associated with the fluid conduit includes a flow-regulating device in fluid communication with the fluid conduit, wherein the flow-regulating device is configured to passively control the flow rate of the bypass stream associated with the fluid conduit, wherein the flow-regulating device includes at least the open configuration, in which the bypass stream may pass therethrough, and a closed configuration, in which at least a substantial portion of the bypass stream may not pass therethrough, and further wherein the flow-regulating device is configured to passively transition between the open configuration and the closed configuration responsive to the value of the variable associated with the fuel cell system.

B3. The fuel cell system of any of paragraphs B1-B2, wherein the means for automatically and passively controlling includes the flow-regulating device of any of paragraphs A1-A34.

B4. The fuel cell system of any of paragraphs B1-B3, wherein the thermal management fluid drive assembly includes any permissible combination of the features recited in paragraphs A3-A7 and A20-A27.

C1. A method of controlling a temperature of a fuel cell stack, the method comprising:
supplying a thermal management fluid to the fuel cell system of any of paragraphs A1-B3 as at least one of a stack thermal management fluid stream, a bypass stream, and a thermal management fluid drive assembly stream; and
controlling a flow rate of the stack thermal management fluid stream that is supplied to the fuel cell stack.

C2. The method of paragraph C1, wherein the controlling includes actively controlling a flow rate of the thermal management fluid drive assembly stream with a thermal management fluid drive assembly.

C3. The method of paragraph C2, wherein the thermal management fluid drive assembly includes a fan assembly, and further wherein the actively controlling includes controlling a rotational frequency of the fan assembly.

C4. The method of paragraph C3, wherein the method further includes detecting a temperature of the fuel cell stack, wherein the actively controlling includes increasing the rotational frequency of the fan assembly responsive to detecting that the temperature of the fuel cell stack is greater than a threshold stack temperature, and further wherein the actively controlling includes decreasing the rotational frequency of the fan assembly responsive to detecting that the temperature of the fuel cell stack is less than the threshold stack temperature.

C5. The method of any of paragraphs C1-C4, wherein the controlling includes passively controlling a flow rate of the bypass stream with a flow-regulating device.

C6. The method of paragraph C5, wherein the passively controlling includes passively transitioning the flow-regulating device between an open configuration, in which the bypass stream may pass therethrough, and a closed configuration, in which at least a substantial portion of the bypass stream may not pass therethrough, responsive to a pressure differential across the flow-regulating device.

C7. The method of paragraph C6, wherein the passively controlling includes controlling without the use of at least one of a controller, a detector, and an actuator, and optionally wherein the passively controlling includes controlling without the use of any of a controller, a detector, and an actuator.

C8. The method of any of paragraphs C1-C7, wherein controlling the flow rate of the stack thermal management fluid stream that is supplied to the fuel cell stack includes controlling a proportion of the thermal management fluid drive assembly stream that is included in the stack thermal management fluid stream.

C9. The method of any of paragraphs C1-C8, wherein controlling the flow rate of the stack thermal management fluid stream that is supplied to the fuel cell stack includes automatically controlling the flow rate of the stack thermal management fluid stream.

C10. A fuel cell system including a controller configured to perform the method of any of paragraphs C1-C9.

D1. The use of the systems of any of paragraphs A1-B3 with any of the methods of any of paragraphs C1-C10.

D2. The use of the methods of any of paragraphs C1-C10 with any of the systems of any of paragraphs A1-B3.

D3. The use of any of the systems of any of paragraphs A1-B3 and/or any of the methods of any of paragraphs C1-C10 to decrease a minimum flow rate of a thermal management fluid.

D4. The use of any of the systems of any of paragraphs A1-B3 and/or any of the methods of any of paragraphs C1-C10 to control a flow rate of a thermal management fluid.

D5. The use of any of the systems of any of paragraphs A1-B3 and/or any of the methods of any of paragraphs C1-C10 to control a temperature of a fuel cell stack.

D6. The use of any of the systems of any of paragraphs A1-B3 and/or any of the methods of any of paragraphs C1-C10 to produce electricity.

D7. The use of any of the systems of any of paragraphs A1-B3 and/or any of the methods of any of paragraphs C1-C10 to produce thermal energy.

D8. The use of a passive flow-regulating device to passively and automatically control a flow rate of a stream of thermal management fluid to a fuel cell stack.

D9. The use of paragraph D8, wherein the use is during low load or cold temperature operation of the fuel cell stack.

D10. The use of any of paragraphs D8-D9, wherein the use is to automatically and passively regulate a flow of a bypass stream of the thermal management fluid through a fluid conduit that is in fluid communication with the fuel cell stack and with a thermal management fluid drive assembly that is configured to provide a motive force for the stream of thermal management fluid.

D11. The use of any of paragraphs D8-D10, wherein the stream of thermal management fluid is an air stream, and optionally wherein the thermal management fluid drive assembly is at least one of a fan or blower.

INDUSTRIAL APPLICABILITY

The systems and methods for regulating fuel cell air flow disclosed herein are applicable to the fuel cell industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A fuel cell system, comprising:
a fluid conduit;
a fuel cell stack in fluid communication with the fluid conduit, wherein the fuel cell stack is configured to receive a stack thermal management fluid stream that flows through the fluid conduit to regulate a temperature of the fuel cell stack, wherein the fuel cell stack includes an open cathode fuel cell stack, wherein the stack thermal management fluid stream supplies an oxidant to the fuel cell stack, and further wherein the fuel cell stack consumes at least a portion of the oxidant with a fuel and produces an electrical output therefrom;
a flow-regulating device in fluid communication with the fluid conduit, wherein the flow-regulating device is configured to passively control a flow rate of a bypass stream associated with the fluid conduit, wherein the flow-regulating device includes at least an open configuration, in which the bypass stream may pass therethrough, and a closed configuration, in which at least a substantial portion of the bypass stream may not pass therethrough, and further wherein the flow-regulating device is configured to passively transition between the open configuration and the closed configuration responsive to a value of a variable associated with the fuel cell system; and
a thermal management fluid drive assembly in fluid communication with the fluid conduit, wherein the thermal management fluid drive assembly is configured to provide a motive force to a thermal management fluid drive assembly stream that flows through the fluid conduit, and further wherein the fluid conduit, the fuel cell stack, the flow-regulating device, and the thermal management fluid drive assembly are configured such that:
(i) the thermal management fluid drive assembly stream includes the stack thermal management fluid stream;
(ii) responsive to the flow-regulating device being in the open configuration, the thermal management fluid drive assembly stream includes the bypass stream and the bypass stream bypasses the fuel cell stack such that a flow rate of the stack thermal management fluid stream is less than a flow rate of the thermal management fluid drive assembly stream; and
(ii) responsive to the flow-regulating device being in the closed configuration, the flow rate of the stack thermal management fluid stream is equal or substantially equal to the flow rate of the thermal management fluid drive assembly stream.

2. The fuel cell system of claim 1, wherein the bypass stream flows through the fluid conduit.

3. The fuel cell system of claim 1, wherein the fuel cell stack is configured to receive the stack thermal management fluid stream from the fluid conduit, the flow-regulating device is configured to receive the bypass stream from the fluid conduit, and the thermal management fluid drive assembly is configured to supply the thermal management fluid drive assembly stream to the fluid conduit.

4. The fuel cell system of claim 1, wherein the thermal management fluid drive assembly is configured to create a positive pressure between the fuel cell stack and the thermal management fluid drive assembly.

5. The fuel cell system of claim 1, wherein the fuel cell stack receives an ambient air stream from an ambient environment proximal to the fuel cell system to generate the stack thermal management fluid stream, wherein the fuel cell stack is configured to supply the stack thermal management fluid stream to the fluid conduit, wherein the flow-regulating device is configured to supply the bypass stream to the fluid conduit, and further wherein the thermal management fluid drive assembly is configured to receive the thermal management fluid drive assembly stream from the fluid conduit.

6. The fuel cell system of claim 1, wherein the thermal management fluid drive assembly is configured to create a negative pressure between the fuel cell stack and the thermal management fluid drive assembly.

7. The fuel cell system of claim 1, wherein the flow-regulating device is configured to passively transition between the open configuration and the closed configuration responsive to the value of the variable associated with the fuel cell system exceeding a threshold value.

8. The fuel cell system of claim 7, wherein the threshold value includes at least one of a threshold pressure and a threshold pressure differential of at least one of the stack thermal management fluid stream, the bypass stream, the thermal management fluid drive assembly stream, and an ambient pressure.

9. The fuel cell system of claim 7, wherein the threshold value is a threshold pressure differential, and further wherein the threshold pressure differential includes at least one of a pressure differential across the flow-regulating device, a pressure differential across the fuel cell stack, a pressure differential across the thermal management fluid drive assembly, and a pressure differential between an interior of the fluid conduit and an exterior of the fluid conduit.

10. The fuel cell system of claim 1, wherein the flow-regulating device includes an orifice and plate assembly that includes an orifice plate and a separate sealing plate, wherein the orifice plate defines an orifice, and further wherein the sealing plate is operatively attached to the orifice plate and is configured to transition the orifice and plate assembly between the open configuration and the closed configuration via translation relative to the orifice plate to selectively permit or restrict flow of the bypass stream through the orifice.

11. The fuel cell system of claim 1, wherein the flow-regulating device is maintained in at least one of the open configuration and the closed configuration by at least one of gravity and a biasing mechanism.

12. The fuel cell system of claim 1, wherein the fuel cell system includes a plurality of flow-regulating devices.

13. The fuel cell system of claim 12, wherein a first portion of the plurality of flow-regulating devices is configured to transition between the open configuration and the closed configuration at a different magnitude of the variable associated with the fuel cell system than a second portion of the plurality of flow-regulating devices.

14. The fuel cell system of claim 1, wherein the flow-regulating device includes a plurality of plate assemblies, wherein a portion of the plurality of plate assemblies includes an orifice, and further wherein the flow-regulating device is configured to provide a plurality of discrete flow restrictions to a flow rate of the bypass stream.

15. The fuel cell system of claim 1, wherein the stack thermal management fluid stream does not include the bypass stream when the bypass stream is flowing through the flow-regulating device.

16. The fuel cell system of claim 1, wherein the thermal management fluid drive assembly includes at least one of a fan, a vane, a pump, a compressor, an impeller, and an ejector.

17. The fuel cell system of claim 1, wherein the stack thermal management fluid stream, the bypass stream, and the thermal management fluid drive assembly stream include a thermal management fluid.

18. The fuel cell system of claim 17, wherein the thermal management fluid includes air, wherein the stack thermal management fluid stream is a stack air stream, wherein the thermal management fluid drive assembly is an air drive assembly, and further wherein the thermal management fluid drive assembly stream is an air drive assembly stream.

19. The fuel cell system of claim 1, in combination with a source of hydrogen gas configured to supply hydrogen gas to the fuel cell stack.

20. A method of controlling a temperature of a fuel cell stack, the method comprising:
supplying a thermal management fluid to the fuel cell system of claim 1 as at least one of a stack thermal management fluid stream, a bypass stream, and a thermal management fluid drive assembly stream; and
controlling a flow rate of the stack thermal management fluid stream that is supplied to the fuel cell stack.

21. The method of claim 20, wherein the controlling includes actively controlling a flow rate of the thermal management fluid drive assembly stream with a thermal management fluid drive assembly.

22. The method of claim 20, wherein the controlling includes passively controlling a flow rate of the bypass stream with a flow-regulating device.

23. The method of claim 22, wherein the passively controlling includes passively transitioning the flow-regulating device between an open configuration, in which the bypass stream may pass therethrough, and a closed configuration, in which at least a substantial portion of the bypass stream may not pass therethrough, responsive to a pressure differential across the flow-regulating device.

24. The method of claim 23, wherein the passively controlling includes controlling without the use of at least one of a controller, a detector, and an actuator.

25. The method of claim 24, wherein the passively controlling includes controlling without the use of any of a controller, a detector, and an actuator.

26. A fuel cell system, comprising:
a fluid conduit;
a fuel cell stack in fluid communication with the fluid conduit, wherein the fuel cell stack is configured to receive a stack thermal management fluid stream that flows through the fluid conduit, wherein the stack thermal management fluid stream includes a stack air stream that is supplied from an ambient environment proximal to the fuel cell stack, and further wherein the fuel cell stack at least one of receives the stack thermal management fluid stream from the fluid conduit and supplies the stack thermal management fluid stream to the fluid conduit;
a flow-regulating device in fluid communication with the fluid conduit, wherein the flow-regulating device is configured to passively control a flow rate of a bypass stream, wherein the flow-regulating device at least one of receives the bypass stream from the fluid conduit and supplies the bypass stream to the fluid conduit, wherein the flow-regulating device includes an open configuration, in which the bypass stream may pass therethrough, and a closed configuration, in which at least a substantial portion of the bypass stream may not pass therethrough, and further wherein the flow-regulating device is configured to passively transition between the open configuration and the closed configuration responsive to a value of a variable associated with the fuel cell system; and
a thermal management fluid drive assembly in fluid communication with the fluid conduit, wherein the thermal management fluid drive assembly is configured to provide a motive force to a thermal management fluid drive assembly stream, and further wherein the fluid conduit, the fuel cell stack, the flow-regulating device, and the thermal management fluid drive assembly are configured such that:
(i) the thermal management fluid drive assembly at least one of receives the thermal management fluid drive assembly stream from the fluid conduit and supplies the thermal management fluid drive assembly stream to the fluid conduit;
(ii) the thermal management fluid drive assembly stream includes the stack thermal management fluid stream;
(iii) responsive to the flow-regulating device being in the open configuration, the thermal management fluid drive assembly stream also includes the bypass stream and the bypass stream bypasses the fuel cell stack such that a flow rate of the stack thermal management fluid stream is less than a flow rate of the thermal management fluid drive assembly stream; and
(iv) responsive to the flow-regulating device being in the closed configuration, the flow rate of the stack thermal management fluid stream is equal or substantially equal to the flow rate of the thermal management fluid drive assembly stream.

* * * * *